US012809457B2

(12) United States Patent
Dasher et al.

(10) Patent No.: US 12,809,457 B2
(45) Date of Patent: Nov. 24, 2026

(54) XR UI APP MANAGEMENT

(71) Applicant: Adeia Guides Inc., San Jose, CA (US)

(72) Inventors: Charles Dasher, Lawrenceville, GA (US); Christopher Phillips, Hartwell, GA (US); Reda Harb, Tampa, FL (US)

(73) Assignee: Adeia Guides Inc., San Jose, CA (US)

(*) Notice: Subject to any disclaimer, the term of this patent is extended or adjusted under 35 U.S.C. 154(b) by 19 days.

(21) Appl. No.: 18/429,728

(22) Filed: Feb. 1, 2024

(65) Prior Publication Data

US 2025/0251787 A1 Aug. 7, 2025

(51) Int. Cl.

| | |
|---|---|
| ***G06F 3/01*** | (2006.01) |
| ***G02B 27/01*** | (2006.01) |
| ***G06T 19/00*** | (2011.01) |
| ***H04L 67/306*** | (2022.01) |

(52) U.S. Cl.

CPC ......... *G06F 3/013* (2013.01); *G02B 27/0172* (2013.01); *G06T 19/006* (2013.01); *H04L 67/306* (2013.01)

(58) Field of Classification Search

CPC ... G06F 3/013; G02B 27/0172; G06T 19/006; H04L 67/306

See application file for complete search history.

(56) References Cited

U.S. PATENT DOCUMENTS 12,450,839 B1 10/2025 Jotwani
2015/0356789 A1* 12/2015 Komatsu ................. G06T 11/60 345/633
2016/0274762 A1* 9/2016 Lopez .................... G06T 19/006
2017/0004655 A1* 1/2017 Scavezze ........... G02B 27/0172
2018/0365898 A1 12/2018 Costa
2019/0180483 A1* 6/2019 DeLuca ............... G02B 27/017
2019/0339840 A1* 11/2019 Park ........................ G06F 3/167
2021/0055791 A1* 2/2021 Liljeroos ............... G06F 3/0485
2022/0155861 A1* 5/2022 Myung ................. G06T 19/006
2023/0221832 A1* 7/2023 Ahn ........................ G06F 3/013 715/757
2023/0289027 A1 9/2023 Aranda

OTHER PUBLICATIONS

Phillips, Christopher , "Data Transmission Throttling and Data Quality Updating for a Slam Device", (U.S. Appl. No. 18/128,934, filed Mar. 30, 2023) & (U.S. Appl. No. 18/128,934, filed Mar. 30, 2023).
Phillips, Christopher , et al., "Guidance for Collaborative Map Building and Updating", (U.S. Appl. No. 18/241,185, filed Aug. 31, 2023).
U.S. Appl. No. 19/533,584, filed Feb. 9, 2026, Charles Dasher.
U.S. Appl. No. 18/429,945, filed Feb. 1, 2024, Charles Dasher.

* cited by examiner

*Primary Examiner* — Hong Zhou
(74) *Attorney, Agent, or Firm* — HG LAW LLP

(57) ABSTRACT

An extended reality (XR) device, for example, a head mounted device (HMD), may provide a visual element when the medium determines that a wearer of the XR device is likely engaging with a physical device. This physical device is then set as the physical object of user focus. An application that is associated with the object of focus is identified and the XR device renders the visual element based on the associated application. The XR device may be caused to prevent displaying a graphical element generated by an application other than the associated application. The visual element may be rendered by the XR device at a fixed location anchored relative to the object of user focus.

21 Claims, 28 Drawing Sheets

503

505a 505b

1200

1300

1700

2000

2500

XR UI APP MANAGEMENT

BACKGROUND

The present disclosure relates to extended reality (XR) displays, for example, augmented reality (AR) displays and, in particular, relates to providing an XR device user interface that includes virtual visual elements revealing information regarding physical objects of user focus and regarding applications associated with the objects of user focus.

SUMMARY

Extended reality (XR) equipment, such as head mounted displays (HMDs), smart glasses, and the like, may be used for augmenting information and to control of physical devices and other objects in a physical space. One or more physical devices, such as smart televisions, household appliances, window shades controls, HVAC controls, handheld devices, or the like, in a physical space may be controlled using a combination of gestures (including voice commands) or handheld controllers of the XR equipment.

A technological problem that arises with such XR equipment is that many icons representing applications (apps) or other virtual objects and virtual displays that can be controlled by XR equipment may be displayed on the screen of an XR device, such as the right and left displays of an HMD. The simultaneous display of many such icons and other virtual visual elements may make it difficult to find visual elements relevant to the current activities, needs or expectations of the XR device user. This may result in a failure to find and interact with the needed virtual element or in delay. Further, the virtual elements may obscure physical objects in the physical space. This may be dangerous as the user of the XR device has to walk in the space and has to avoid bumping into physical objects or crashing into physical walls or windows. In a related vein, even if only relevant virtual elements were displayed at any one time, they may be positioned haphazardly where the XR device user is not expecting them or most needing them.

According to an aspect of the disclosure, the system may predict a physical appliance, device or other object that is the XR device user's current object of focus (sometimes referred to as the object of focus or the physical object of user focus) based on a determination of what is likely to be of current user interest. Based on the prediction of the object of focus, icons or other virtual visual elements may be positioned to be on or near the object of focus with which they are associated. Only one or more icons or other visual outputs (sometimes referred to as visual elements) of applications relevant for accessing, controlling or otherwise interacting with the current object of focus may be displayed by the XR device at any one time. Further, such icons or other visual elements may be displayed only while the system continues to determine a likelihood of the XR user's intention to view or to interact with the current object of user focus. In addition, the visual element may be positioned to be seen by the XR device wearer to be fixed on, near or otherwise in association with the object of user focus, and the visual element may be seen as anchored at a specified location.

User focus for an object may be determined based on physical proximity of the XR device to the physical object, a field of view of the XR device encompassing the physical device or other object, and/or a user gaze detected by the XR device to be on the physical device or other object. User focus may also be determined based on an activation state of the physical device—for example, if a TV is on and a streaming application is running, then an icon, widget for controlling the app, an electronic programming guide (EPG) listing the content streaming or available via the app, and/or a virtual display showing what is streaming or what will be streaming via the app, may be shown by the XR device as the visual element. An XR device user's intention to use or to interact with the physical object may be determined based on the XR device user's activation of controls of the physical object, such as a remote control for a television, XR device handheld controllers, and/or the XR device user's hand or eye movements or other gestures, including voice queries and commands. The voice queries may be directed to the smart device or a smart speaker that is capable of controlling the smart device (e.g., a smart speaker may be configured to control the operation of a Smart TV when the Smart TV is the object of user focus). The object of user focus may be determined based on user profile information or historical usage of the physical device—for example, the XR device user often watches news on the TV at 7:30 pm; trending uses of the physical device—for example, a broadcast of the user's favorite football team is starting; and/or significant external events—for example, a major storm is forecast as imminent and the windows are open. A trained machine learning model may be used to predict a likelihood of XR device user interest in a physical device or other object, and/or in an application associated with the physical device or other object.

The system may keep track of the location of physical devices or other objects in a physical space and of the XR device so as to be able to determine proximity of the XR device to objects and to determine when the field of view and/or gaze is trained on the physical device or other object. The objects in the physical space may be previously mapped, for example, using a Simultaneous Localization And Mapping (SLAM) technology, and stored onsite for example, in a device communicating with the XR device via a local network, such as via Wi-Fi, or possible on the XR device, or may be stored remotely.

The visual element may be deactivated and disappear from view if the system determines that the object of focus is no longer in the proximity of the XR device. Similarly, the object of focus may be demoted from being the object of focus if it is no longer in the field of view of the XR device, a user gaze detected by the XR device is no longer on the object of focus, and/or an intention of the XR device is otherwise not determined to be to engage with the object of focus.

A technological solution to the above-noted technological problem and to other problems that may be provided by one or more aspects of the present disclosure is that virtual icons or other visual elements may be conveniently organized, positioned and re-positioned for the relevant object of focus. An improved XR device user interface may be obtained because the XR device user can look for the visual element at a location where it is relevant and informative for the object of focus.

Relatedly, an improvement to the functioning of the computer system itself is provided because the XR device may provide an "X-ray" glimpse of "contents" of the object of user focus, whether the object of focus is powered on or off. That is, apps running, or available on, the object of focus and/or information about, clips of, characters or performers appearing in, and/or recommendations for media content available now or in the future via the object of focus, may be displayed or played as a visual element by the XR device.

In an embodiment, appliances and other electronic devices, books and other printed literature and the like can “come alive” in the improved user interface of the XR device, as the XR device display is enabled to show relevant information and other visual elements in response to the wearer looking around the physical space and one or more cameras or other sensors capturing identifying information about the object. The captured information, such as the barcode, model number, ISBN, title or author of a book, may be used to search for additional content about the item and presented as a visual element, by the XR device. For example, the visual element may be a virtual tile in which a video about the item is played. Audio information, including sound that would normally accompany such visual elements, may also be provided.

A method, system, non-transitory computer-readable medium, and means for implementing the method are disclosed for controlling virtual displays. Such a method may include: receiving an indication of an object of user focus determined for an extended reality (XR) device; receiving an identification of an associated application, wherein the associated application is previously associated with the object of user focus; retrieving a visual element for the associated application; and causing the XR device to display the visual element associated with the object of user focus.

For example, the XR device may be a head mounted device (HMD). The XR device may be caused to prevent displaying a graphical element generated by an application other than the application associated with the object of user focus. The XR device may display more prominently the visual element associated with the object of user focus than visual elements generated by applications other than the application associated with the object of user focus. The XR device may display the visual element such that the visual element is perceived to be at a fixed location anchored relative to the object of user focus.

An instruction input may be received at the XR device for selecting the fixed location of the visual element as seen by the XR device wearer. The fixed location may be anchored at a fixed spot relative to the object of user focus is determined based on the instruction.

The object of user focus may be a first computing device, and the application associated with the object of user focus may be determined by: identifying a second computing device communicating with the first computing device; and identifying, as the application associated with the object of user focus, an application running on the second computing device. The object of user focus may be determined based on physical proximity of the XR device to the object of user focus. The object of user focus may be determined based on a user profile associated with the XR device. The object of user focus may be determined based on the object of user focus being in a field of view of the XR device. The object of user focus may be determined based on a user gaze determined by the XR device.

The visual element may include an icon associated with the object of user focus or associated with an app running or available on the object of user focus, and/or the visual element may include an interface for interacting with the object of user focus and/or with application. The visual element may include a visual indication of status information about the object of user focus and/or an app running or available thereon.

Contemplated are a device, system, non-transitory computer readable medium, method, and means for performing the method XR display control. Such a method may include: receiving an indication of a physical object of user focus determined for an extended reality (XR) device; receiving an identification of an associated application, wherein the associated application is previously associated with the physical object of user focus; retrieving a visual element for the associated application; and causing the XR device to display the visual element associated with the physical object of user focus.

The XR device may be a head mounted device. For example, a television or a computer monitor may be the physical object of focus. The XR device may prevent displaying a graphical element generated by an application other than the application associated with the physical object of user focus. The XR device may display more prominently the visual element associated with the physical object of user focus than visual elements generated by applications other than the application associated with the physical object of user focus. Or, the XR device may display the visual element such that the visual element is perceived to be at a fixed location anchored relative to the physical object of user focus.

The XR device may receive an instruction for selecting the fixed location of the visual element. This fixed location may be anchored relative to the physical object of user focus is determined based on the instruction. For example, if the XR device wearer turns his/her head, the visual element may remain next to a TV, when the TV is the physical object of focus.

The physical object of user focus may be determined in a variety of ways. For example, it may be determined based on a physical proximity of the XR device to the physical object of user focus, based on the physical object of user focus being in a field of view of the XR device, or based on a user gaze determined by the XR device. A user profile associated with the XR device may also be accessed to determine the physical object of user focus.

The visual element may include an interface for interacting with the application or a visual indication of status information about the physical object of user focus. For example, controls displayed by a head mounted display may be triggered by user gestures.

Also contemplated are a device, system, non-transitory computer readable medium, method, and means for performing the method for application discovery by an XR display. Such a method may include: receiving an indication of a physical object of user focus determined for an extended reality (XR) device; receiving an identification of an associated application—the associated application controlling a current visual output of the physical object of user focus; determining, based on the current visual output, a complementary visual element complementing the current visual output; and causing the XR device to display the complementary visual element while the current visual output is provided by the physical object of user focus.

If the physical object of user focus is a first computing device, the associated application may be determined by: identifying a second computing device communicating with the first computing device; and identifying, as the associated application, an application running on the second computing device. The complementary visual element may include active controls configured to control the associated application by receiving user input via the XR device.

If the current visual output of the physical object of user focus is a first media item, for example, a television show or a movie, the complementary visual element may be a second media item, for example, a recap or trailer for a show related to the first media item. Or, the complementary visual element may include information related to a content of the first media item. For example, the complementary visual element may include information about when the first media item will be broadcast or become available, prices for accessing the first media item, critical reviews or aggregated user ratings of the first media item, information about performers appearing in the first media item or the like.

The XR device may display the complementary visual element so as to be seen on a physical surface near the physical object of user focus. For example, the complementary visual element may be displayed to be seen near the physical object of user focus such that a location of the complementary visual element is unmoved in response to a change in a field of view of the XR device or in response to a change in a gaze of an XR device wearer. In response to the physical object of focus displaying a new visual output different from the first visual output, the XR device may display a second complementary visual element that corresponds to the new visual output. For example, a different scene of a movie being displayed by the TV may warrant that the XR device display information about the new scene. Or by way of an additional example, if the first visual output of the physical object of user focus was provided by a first application running on the object of user focus and the new visual output of the physical object of user focus is provided by a second application running on the object of user focus, the second complementary visual element may enable interaction with each of the first associated application and the second associated application. In this way, the second complementary visual element may empower the XR device wearer to control both applications, for example, to switch between them.

Other aspects and features of the present disclosure will become apparent to those ordinarily skilled in the art upon review of the following description of specific embodiments in conjunction with the accompanying figures.

BRIEF DESCRIPTION OF THE DRAWINGS

The present disclosure, in accordance with one or more various embodiments, is described in detail with reference to the following Figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 2:
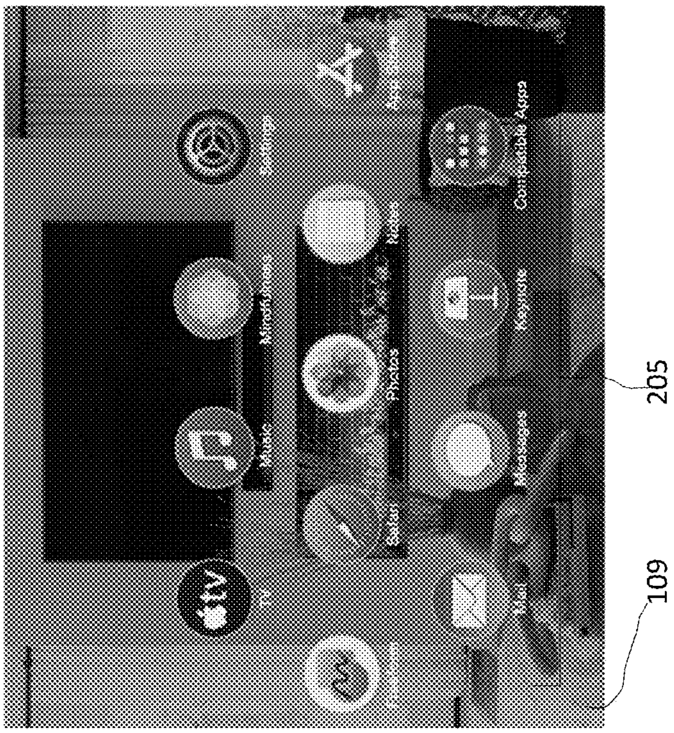
FIG. 2 illustrates an example of the television set with icons associated with a variety of applications cluttering the user interface of the display of the XR device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood that the embodiments and examples described herein may be practiced without these specific details. In other instances, well-known methods, procedures and components, including software, firmware and hardware components, have not been described in detail so as not to obscure the embodiments described herein. Also, the description is not to be considered as limiting the scope of the embodiments described herein.

References herein to an "XR device" refer to a device providing virtual reality (VR), mixed or merged reality (MR), or augmented reality (AR) functionality (e.g., wherein virtual objects or graphic overlays are provided in addition to real-world objects or environments visible via the device). The terms AR and MR may sometimes be used interchangeable with XR herein. An XR device may take the form of glasses or a headset in some instances (e.g., a head-mounted display or HMD). While some references are made to a VR device or devices, it will be appreciated that some or all of the described techniques may be implemented with respect to any suitable XR device (e.g., an XR device that provides an MR or AR scene that is partially or wholly populated by virtual objects). For example, some or all of a real-world environment may be visible via XR devices of multiple users, and the users may generate reconfigured safe areas and a virtual partition for their XR devices utilizing the techniques discussed herein. In some embodiments, the described XR or VR devices may include see-through capabilities enabling the display of some or all of a user's real-world environment. Sometimes various types of XR equipment may be referred to as an HMD. For example, the XR device may include optical see-through (OST) capability in which light passes through the display, providing "through the glass" visibility of an environment. In an embodiment, the XR device may include video see-through (VST) capability, wherein cameras (e.g., mounted on or within the XR device) capture images or video of the user's environment and render a corresponding video, allowing the user to view, in whole or in part, his or her real-world environment by way of the video. In some embodiments, the device may be any suitable XR device configured to display virtual objects within a scene including any suitable combination of a real-world environment, a virtual environment, and/or virtual objects. It may be determined whether the XR device is connected to Wi-Fi and the Internet. If it is not connected to a network, then network connectivity is obtained. In an embodiment, the XR devices are connected using the same Wi-Fi network to facilitate integrated use.

Figure 1:
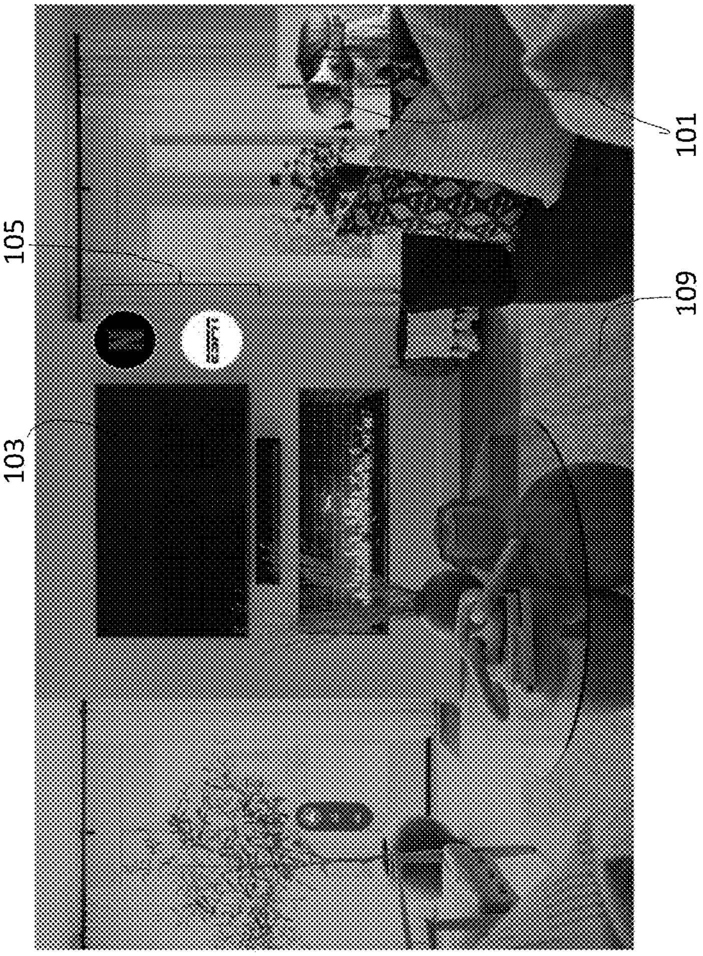
FIG. 1 illustrates an example of a physical device, illustrated by way of example as a television set that has been determined as the object of user focus, and icons associated with apps that are available on the physical device, according to an aspect of the disclosure.

FIG. 1 illustrates an example of what may be seen in an XR device 101 when looking at a television 103. The XR device 101 may detect the XR device wearer's gaze and determine that a user is "looking" at the Television set 103. The XR device 101 may be connected via server, such as a local area network (LAN) server or via the Internet to a controller device.

Based on the physical device or other object determined to be the object of user interest, or based on applications associated with such a physical device, a variety of types of displays may be provided by the XR device 101. For example, a TV application such as a broadcast service application or Over-The-Top media service (OTT) application, associated with the object of focus (e.g., installed on 103), an icon for the app or for the platform or broadcast service, an identifier of a content item being shown, or that will be shown, via the application, a trailer for the content item, a frame, segment or icon of the content item, biographical information or a picture of an actor, performer, producer, player or star associated with the content item, and/or an Electronic Program Guide (EPG) listing current or future content available via the app, or via the platform or source associated with the app (sometimes referred to as a glimpse or a visual element) may be shown or played. In an embodiment, the visual element displayed by the XR device 101 may include a virtual display—a spatial player—that shows the content that the user is deemed likely to watch. Such a feature may use the relevant application in the background to present a content item seen by the XR device 101, such as a virtual tile that shows a TV show or other content item, or that shows a frame, collage, or segment of a show, or other information about the content item or about the app, that XR device wearer may continue watching even after the user decides to turn on the TV 103.

As shown in FIG. 1, the user wearing XR device 101 may see the ESPN and Netflix application icons 105 in response to a number of different events. Several examples are described below.

In a first example, the system determines a proximity of the XR device to the TV 103. For example, upon determining the proximity of the XR device 101 for a minimum threshold period of time, for example, 1-50 seconds, to the TV 103, the TV 103 may be set as the object of focus and apps associated with the TV 103 may be retrieved. Proximity may be determined, for example, by the system knowing the location of the XR device 101 and the location of the physical device using SLAM technology along with spatial coordinate anchors to the TV and spatial anchor offsets to the TV for the display of associated icons or glimpses.

In a second example, the system determines that the TV 103 is in the field of view of the XR device. For example, after determining that the TV 103 is in the field of view of the XR device for a minimum threshold period of time, for example, 1-50 seconds, the TV 103 may be set as the object of focus. The field view of the XR device 101 may be determined by knowing an orientation in the physical space of the XR device 101 and knowing the location of the XR device and the location of the physical device in the physical space.

In a third example, the system determines that the gaze of the XR device wearer is focused on the TV 103. A minimum threshold period of time, for example, 1-50 seconds, may be set to trigger such a determination. Gaze detection may be determined by cameras inside or otherwise on the XR device 101.

In a fourth example, the system determines an activation status of the physical device and/or of an app running thereon. For example, if the TV 103 is detected as powered on, and the ESPN app is running, then an icon or other visual element for the ESPN app may be displayed in addition to, or instead of, a visual element for the TV 103.

In a fifth example, the system detects XR device 101 input for the physical device. For example, XR device 101 may have hand-held controllers, or user hand or head gestures may be detected, for controlling or interacting with the TV 103.

In a sixth example, the system determines a likelihood of user intent to engage with the physical device. For example, the system may determine, based on a TV viewing history contained in a user profile associated with the XR device 101, or based on a TV viewing history of a profile associated with the TV 103, that the user intends, or may be likely to intend, to watch the TV 103 at this time. By way of illustration, the system may signal an application that controls the XR device 101 to display the ESPN and Netflix application icons 105 if the user's profile indicates that the viewing history of the user, or the viewing history of a user associated with the TV 103, shows both that a user often watches sports via ESPN and that the user sometimes watches movies via Netflix in the evenings and the time is 11:00 PM. Such a display may include one or more of a content identifier or other visual element. Determining historical user patterns stored in user profile data of other users who watch the TV 103 may also be used to predict a likelihood of engagement with the physical device, for example, apps of the TV 103.

In a seventh example, the system determines that a content item or activity is now trending. Such a determination may be based on one or more content items, such as a broadcast sporting event being shown on ESPN, that is trending at this time. The sporting event may be about to start or may be in progress.

In an eighth example, the system determines an intention to watch the TV 103, or a potential such interest, in response to detecting key or wake words related to media consumption. For example, via the XR device 101, the user's voice may be recognized to say, "I want to watch the news" or "isn't the Knicks playoffs game supposed to be on today," or the XR device 101 may discern some other user in the physical space or located remotely communicating with the user wearing the XR device 101 speaking or messaging words to that effect.

In a ninth example, the system determines that a significant news event is happening or is forecast to happen. For example, the TV 103 may be set as the object of focus and a PBS icon or other news source-related visual elements may be displayed in response to a determination that a major news event, such as an election result has been published, or a barometer or temperature forecast may be displayed at a thermometer or on/near a door or window in response to receipt of a report or forecast of a major weather event.

In a tenth example, with or without knowledge of user's viewing habits or other external information, icons may be displayed on, near or around the TV 103 if the application exists on the TV 103 and/or exists on a connected OTT device. By way of illustration, an icon of an application may be displayed besides the TV 103, and the XR device user may select the icon of an application displayed, in response to which the TV 103 and/or the connected OTT device may power on. Also, the application whose icon was thus selected may be automatically launched on the TV 103 and/or on the connected OTT device. The user's profile, according to the user associated with the XR device, may also be accessed so that a visual element may display an option to resume previously consumed content, a recommendation for additional content, a search bar for new content items, et cetera, according to the user profile retrieved. The XR application may also provide some interaction/control of the app's UI and control of the video playout that is presented on the TV through the app running in the XR device. In this case, the ESPN app on the XR device 101 may be running in a "paired" mode.

which is not the same UI and interaction as if the app icon was selected in the app icons not associated with a location/device in the XR headset.

In an eleventh example, the system determines user intent based on a combination of more than one of the above-listed factors and/or based on additional factors or determinations. For example, the ESPN visual element may be displayed by the XR device 101 if the system determines a XR device user gaze on the TV and also knows based on previous usage that the XR device user watches ESPN on Sunday afternoons 3-6 pm. Continuing with this example, regardless of user gaze, no visual element associated with the TV 103 or its apps may be activated weekdays 9-5 PM, and the Netflix visual element is activated in response to detection of user gaze on the TV 103 on Saturday evenings 8-11 pm. Such a policy may be set manually or may be determined based on machine learning-enabled methods or other automated methods for determining viewing patterns.

The examples described above are illustrative and should not be interpreted as an exhaustive list. Any other suitable determination, detection, or input may be used to trigger display of the icons.

According to an embodiment, an app may be assigned a weight different from a weight assigned to a second app, depending on the frequency of user engagement with each app, how recently each app was launched by the user, and other such viewing or use habits or patterns accessed in a user profile associated with the XR device 101 or with a user profile associated with the physical device or app. The weights may be used to determine which app's icon or other visual element should be "surfaced" when the physical device 103 is set as the object of focus. For example, if the system determines that the Netflix app was most recently used on the physical device 103, or that the Netflix app was used more frequently than the ESPN or the YouTube app, then the Netflix icon may be displayed as the visual element near the TV 103 but not the ESPN icon or the YouTube icon. In a further embodiment, in such a case the Netflix icon may be displayed more prominently, for example, as bigger, more bold, higher in space or more eye level, than the remaining icons.

In an embodiment, if a content item associated with a user profile of user A is currently being streamed via the Netflix app, the XR device 101 worn by user B may still display a visual element associated with the application providing the content item. The glimpse may also include, as a virtual display or spatial player, of the content being streamed via the app, as well as recommendations for current or future programming or content. That is, the system may detect that XR device 101 is in proximity of the TV 103 and the XR controller may launch an instance of the Netflix app whose output would be displayed by the XR device 101. The glimpse may also include an actionable item or button to command "continue watching" a content item, for example, a content item identified on a display of the TV 103 or on a virtual element provided by the XR device 101. The glimpse may also an actionable item or button to command "continue watching" a content item, for example, a content item identified on a display of the TV 103 or on a virtual element provided by the XR device 101. The visual element may change in response to user gestures or other commands, or based on a history of user actions accessed in the profile of the user associated with the XR device or in the profile of the user associated with the physical device. For example, the system may determine that when opening the Netflix app of the TV 103 and navigating to a particular show series, the last two times the user opted to activate the "continue watching" feature. The visual element may then be customized by displaying a "continue watching" actionable menu item or otherwise activatable button that may be activated by the XR device wearer, for example, by a gesture.

In an embodiment, XR users may turn on/off glimpses for one or more specific apps and/or for one or more specific physical device. For example, there may be a registration phase for adding the TV 103 in the living room to the XR device controller. One or more applications residing or associated or available on the TV 103 may also be registered with the XR device 101. Similarly, one or more local or remote ancillary or additional devices or servers logically connected to the TV 103 (sometimes referred to herein as ancillary devices) may also be registered with the XR device 101. For example, a Fire TV stick or other dongle, a DVD player, or other such device, a server, such as a streaming media content platform, or apps running on such devices or servers, may also be registered with the XR device 101. In an embodiment, apps associated with ancillary devices and/or servers connected to the TV 103 may be automatically detected based on the registration of the TV 103.

According to an embodiment, physical devices nearby, such as the TV 103, may be automatically detected as turned on and added in real time as needed "on the fly" to a list of devices with apps recognized by the XR device 101. For example, if an app is currently running on the TV 103, the XR device 101 may determine which app is running. Existing network discovery technologies may be used to determine the app that is running. Accordingly, the app currently running on the TV 103 may be recognized and a visual element or glimpse may be displayed or prioritized on the XR device 101, according to whether the corresponding app has been turned on/off as registered with the XR device 101. Visual elements displayed by the XR device 101 may thus be generated according to apps thus manually or automatically registered.

In a further embodiment, the TV 103 or other physical devices and apps may be detected and added based on historical use of the apps. For example, a last launched app, or apps that the user opens at specific times, e.g. Hulu at 8 PM to watch news, etc.) may be thus registered with the XR device 101. Proximity to the physical device 1013, historical viewing habits and patterns, user profiles, and other factors discussed herein may dictate physical devices, ancillary device and apps to be added. For example, if it is determined, according to the settings for the user profile of user B currently associated with the XR device 101, that user B has turned on the Netflix app, then the Netflix app would be launched and output of the Netflix app would be displayed by the XR device 101. This would be done upon detecting proximity to the TV 103 or in response to other such app activation as discussed herein, as the XR device 101 controller retrieves a glimpse of the Netflix app for display by the XR device 101.

In an embodiment, a second user wearing a second XR device in the same physical space would see the same thing seen by the wearer of the XR device 101. That is, the system may designate a first XR device 101 as the primary one and additional XR devices would render the visual elements at the objects of focus as determined for the XR device 101. In this way, visual elements anchored to a physical device may also be provided by the second XR device and the two users can share the experience.

According to an embodiment, a second user wearing a second XR device would not necessarily see the visual elements rendered by the XR device 101. Accordingly, the second XR device would see other visual elements rendered for the second XR device based on a second object of focus determined for the second user. The object of user focus for the second XR device user, and the applications of the object of user focus for the second XR device user, may be determined as described herein independent of those for the first XR device. In this way, each of the first and second users would have their own experiences in the same physical space.

A policy may be set for the positioning and size of a visual element and for when the visual element is displayed. For example, a policy may specify that an icon representing a streaming app for the TV is only displayed starting at 6:30 pm, regardless of the proximity of an XR device, the field of view of the XR device, and/or the detected gaze of the XR device wearer. Or, a policy may specify that virtual user controls for interacting with a home air conditioning system are displayed when a front door of the house is opened. Such policies may be set via the XR device or they may set automatically based on patterns of use determined for the physical device.

The visual element may be anchored to such a location irrespective of the movement of the XR device 101 and its wearer throughout the physical space. For example, the visual element may be automatically, or by default, be positioned on or near the TV 103.

In an embodiment, the visual element may move if the wearer of the XR device 101 turns his/her head so that it remains displayed within the field of view of the XR device 101. In a further embodiment, the visual element may disappear if the XR device wearer leaves the vicinity of the physical device with which the application is associated. Such settings, to anchor the visual element at or on the physical device, to move it with the field of view of the XR device, or to remove it if the XR device 101 leaves the vicinity of the physical device may be set automatically or may be based on user preferences.

In an embodiment, the icon or other visual element would appear or "surface" only when the XR device 101 is engaging with the physical device—when the app has been activated, for example, when the physical device 103 is on, when the associated app has been launched, or when the physical device 103 is turned on and/or the associated app is launched by XR device user gesture or the like. In an embodiment, the icon or other visual element appears upon determination that the physical device 103 is in proximity of the XR device 101, field of view of the XR device 101 or the like, and that the physical device with which the application is associated becomes an object of focus, as discussed above. In a further embodiment, the icon or other visual element is present whenever the XR device 101 is detected in the proximity of the physical device 103, such as in the same room, and the physical device 103 is detected to be within the field of view of the XR device 101.

In an embodiment, visual elements may be presented in a uniform and consistent manner regardless of what user interaction triggered the system to generate them or how a likelihood of user interest was determined for the physical device or app thereof. According to a further embodiment, visual elements in a physical space or in a home or office for a variety of physical devices, regardless of the content they display, may adhere to a set of predefined interaction rules. These rules may include standard gestures or voice commands that allow users to engage with the visual element to access more detailed information, close the glimpse, or to execute related actions within the application. This uniformity in interaction across various glimpses may streamline and facilitate the user experience, allowing for a seamless transition between different types of content and applications within the XR environment.

Additionally, the display of the visual element may be adjusted to the plane on which the item resides or onto a plane projected from the item (for example the wall on which a thermostat is mounted or the plane extending from the edges of a television screen). Visual elements may be adapted in their visual or audible representations. The XR system may dynamically alter their size, orientation, or transparency depending on the user's perspective and distance from the spatial anchor that is the object of focus.

As discussed, in an embodiment the TV 103 may be off but the system may store viewing patterns associated with a profile the user wearing the XR device or viewing patterns associated with profiles of user of this TV 103 to determine that the dongle, such as a FireTV stick, plugged into an HDMI port of the TV 103 or other device physically or wirelessly associated with the TV 103, had been logically connected to the TV 103 and providing content. In a similar manner, the system may store profile information and remember what applications, for example, Netflix or Hulu, provided content to the TV 103, and/or what platforms or server systems were streamed to the TV 103. The system may determine that Netflix is running on the TV via the FireTV stick, and may request or receive "glimpse" information from the running Netflix app on the FireTV stick, and so the XR device 101 may display the Netflix XR application launch icon, or display information associated with the user profile that is currently logged into the Netflix service.

In an embodiment, even without a determination of what content the user wearing the XR device 101 may be interested in consuming, the most popular content or "tending right now" content items may be played by the XR device 101 positioned near or on the TV 103. Or, a frame representation or other visual element related to the show, or an EPG grid highlighting the content, may be shown in this way.

The visual elements may be adjusted based on external factors such as ambient light or based on various states of the Netflix application, for example, if Netflix is paused or the nature of the content. The system may contextually adjust the visibility and organization of the related application icons and application data. Change in size, change from a 2 dimensional representation (such as a grid or on a plane) to a 3 dimensional representation, change in color, change in opacity, change in style, change in audible characteristic (for example an application icon could make a noise when it is visible), provide haptic feedback such as vibration, change based on last use, such as an icon for a media content application, change based on popularity, change based on the release of a newer version of the item, such as when a new thermostat is released by a thermostat manufacturer, among other methods of indicating or alerting a user to the presence of the icon.

FIG. 2 illustrates an XR device interface in the same physical space 109 overlaid with a grid of visual elements that obscures much of the view of the physical space 109. Display of so many icons may make it difficult to distinguish between what is relevant from what is irrelevant according to the present needs of the wearer of the XR device 101. Icons may appear or disappear according to gestures of the XR device wearer. Such icons are typically not associated or anchored to any spatial coordinates and may follow the user's view until a gesture is made for them to not be visible. These icons may open the application which would default to the initial opening of an application like on a tablet or phone, and the default mode opening may not be based on the associated device or device state.

Figure 3:
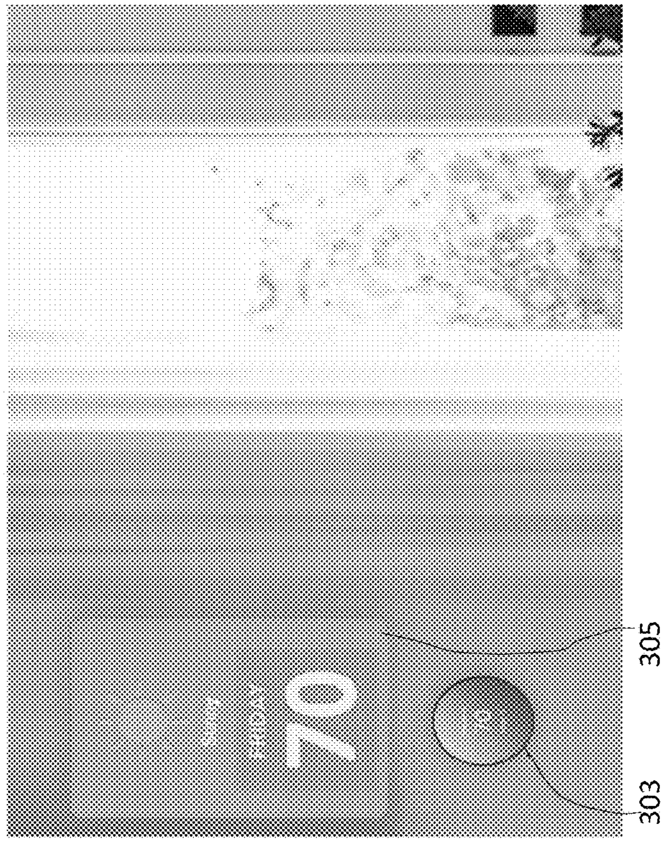
FIG. 3 illustrates an object of user focus, shown by way of example as a household central temperature controller, and a visual element displaying information obtained therefrom, according to an aspect of the disclosure.

FIG. 3 illustrates a visual element 305 displayed by the XR device 101 adjacent physical device 303, in this case the temperature setting device for a home. In the example illustrated, visual element 305 shows some information displayed by the object of focus as well as additional information and graphics.

In the example provided in FIG. 3, the visual element 305 may be displayed so as to be at eye level with the XR device 101. Thus, a height of the XR device as well as its position and orientation may be determined by the system for positioning the visual element. In addition, a size of the visual element 305 it is displayed may be determined according to the distance from the XR device. Thus, a smaller visual element with smaller lettering and smaller graphics may be provided if the wall on which it appears to appear is closer to the XR device 101.

Figure 4:
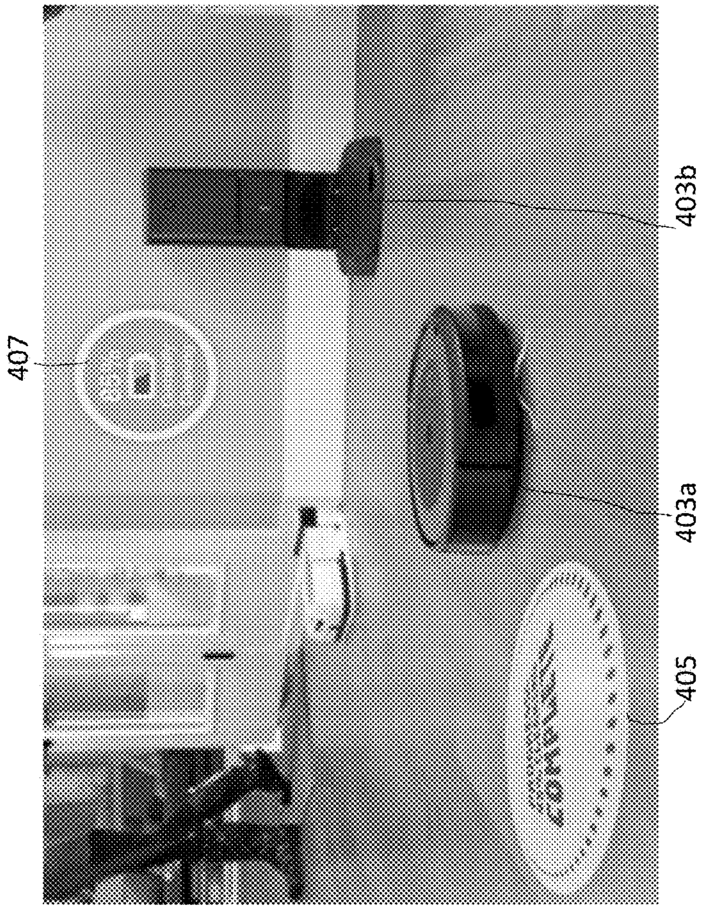
FIG. 4 illustrates an object of user focus, shown by way of example as an autonomous vacuum cleaner and charging station for the vacuum cleaner, and respective visual element for each one displaying information obtained therefrom, according to an aspect of the disclosure.

FIG. 4 illustrates a visual element 405 made to appear near physical device 403*a*, in this case provided as an autonomous vacuum cleaner. A second visual element 405 me be provided near the base of the autonomous vacuum cleaner 403*b*. Each visual element 405, 407 may display information and graphics relevant to the physical device 403*a*, 403*b* near which they are seen. The first visual element 405 may be based on a first application associated with the autonomous vacuum cleaner 403*a*, and the second visual element 408 may be based on information for the same or for a second application relevant for the base of the autonomous vacuum cleaner 403*b*.

In an embodiment, the visual element may move automatically in response to movement of the object of focus, and then may be anchored at the new location. Such responsive movement by the visual element may be a function of a fixed offset from the coordinates of the object of focus, discussed below with respect to FIGS. 18-19 and 23. For example, in response to movement of the autonomous vacuum cleaner 403*a*, the XR device 101 may show the visual element 405 as moving to maintain its proximal relationship with the autonomous vacuum cleaner 403*a*. The visual element 405 may continuously be shown at an offset from the coordinates of the object of focus and thus move in response to movement of the object of focus.

Figure 5:
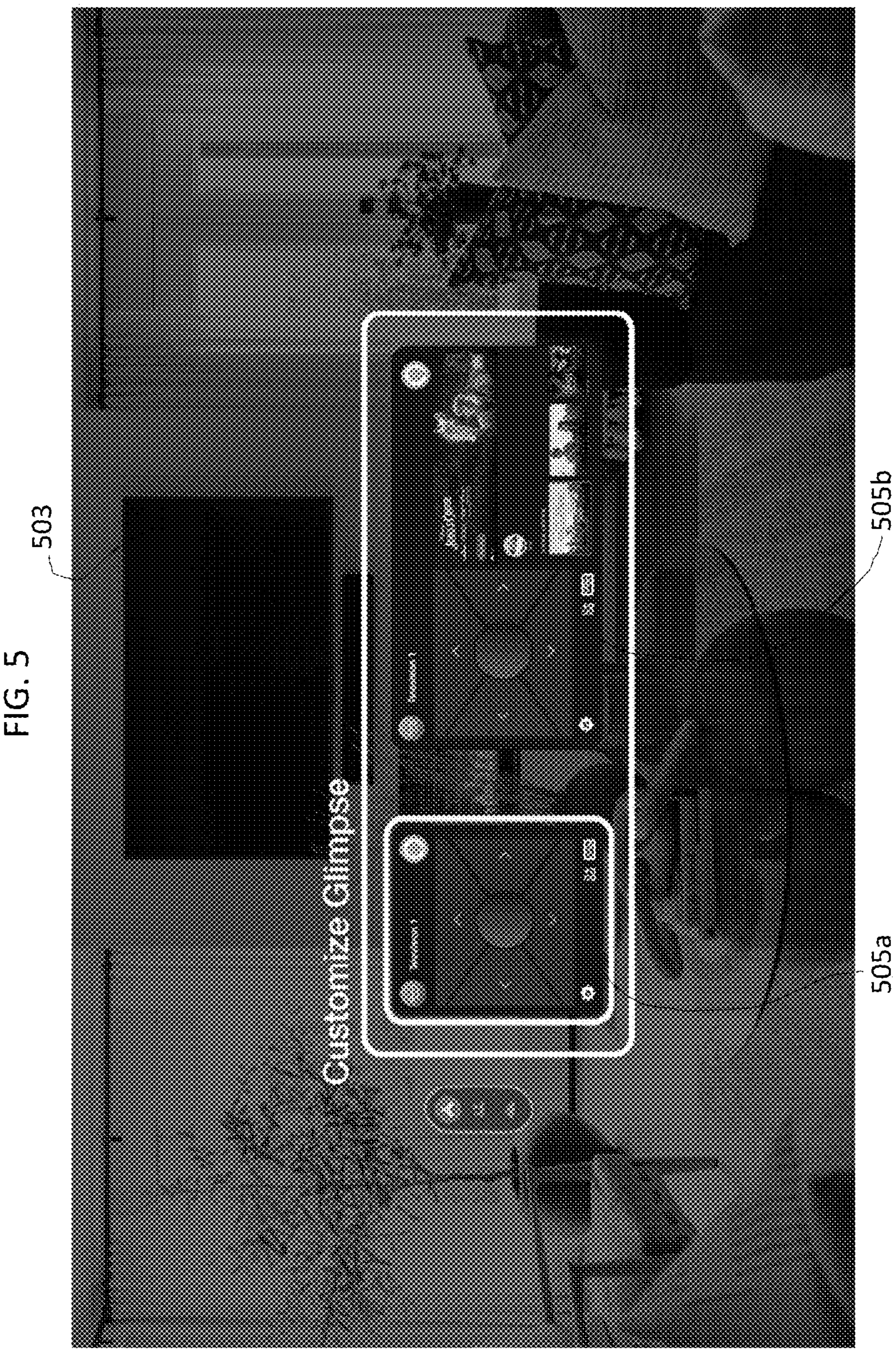
FIG. 5 illustrates visual elements that may be selected for an object of user focus, according to an aspect of the disclosure.

In an embodiment, glimpses may comprise both standard interface features and features which may be personalized for an individual user based on their profile within the XR headset, XR application or other methods of personalizing content. FIG. 5 illustrates a selectable interface provided by the XR device 101 for interacting with a physical device 503. In an embodiment, the visual element may be dynamically adjusted based on a plurality of factors, such as physical device state, time of day/week/year, user profile associated with the XR headset or with the physical device, and the like. For example, the system may determine that the physical device is off, or that a device, such as a FireTV is not connected to it, or that one or more apps are not active on the TV.

The visual element may aggregate data from one or more sources, such as showing upcoming shows from a first source—an app associated with a content platform, and/or a recommendation for a content item from a second source.

Accordingly, visual element 505*b* may be provided in such a case. If the TV is determined to be in an on state, for example, if the TV is on and the application running in the foreground of the device is a media streaming application, a larger portion of the glimpse interface may be assigned to the currently running application. For example, if the TV is on and Hulu is the currently running application, the visual element automatically provided may be focused on data and interactions provided by the Hulu application. However, as shown in visual element 505*b* of FIG. 5, the visual element may also enable the user simultaneously to interact with a second app running on the TV, on a secondary device, such as a Roku stick or DVD player connected to the TV, or a on a server connected to the TV, or a secondary app that is available but not currently active thereon.

In an embodiment, the wearer of the XR device may select the type of visual element 505*a* or 505*b*. As shown in FIG. 5, visual element 505*a* may also include virtual controls that the XR device user may use to control the physical device and its apps.

Figure 6:

FIG. 6 illustrates visual element 605 with controls for the physical device 603. Visual element 605 may be used to select content for display by the physical device 603. Visual element 605 may be anchored at the physical device 603.

According to an embodiment, the visual display 105 is coordinated with the state of the application running on the physical device 103 and/or with the app providing output to the physical device 103. Thus, if an XR device user gestures to open an app associated with an icon displayed by the XR device, a corresponding app would launch on the physical device 103. The visual element 105 that the XR device 101 had displayed as an icon, may now be changed and displayed by the XR device 101 as a controller for the apps that is being output being displayed by the physical device 103. If the Netflix app on the TV 103 is already identifying a media content item and also shows an actionable menu to resume watching, the XR device 101 may automatically show a visual element 105 that provides a controller for the Netflix app that enables activating the resume watching widget. The visual element may also show additional features, such as a frame or a video clip of a recap of a previous episode, a trailer of the present or future episode or recommendations for other content items. Further, if the Netflix app on the TV 103 is already playing a media content item, the XR device 101 may automatically show a visual element 105 that provides a controller that enables activating stopping play of the content item on the TV 103, trick play such as fast forward, and the like.

Figure 7:
FIGS. 6-7 illustrate visual elements that may be available for an object of user focus, according to an aspect of the disclosure.

FIG. 7 illustrates visual element 705 showing a recap option for content selected for viewing on the physical device 703 and further recommendations available for consumption selected based on the content selected for viewing on the physical device 703. In an embodiment, the content displayed by the visual element 605, 705 may be selected by the system according to a viewing history associated with a user profile of the XR device user. For example, if according to the viewing history the XR device wearer, the a TV series has been watched, then the visual element 605 may be provided automatically because the XR device user is likely to intend to watch the next episode and just needs the virtual controls displayed to command a start of play. In an embodiment, the system may determine that a user who has been detected to be interested in a particular show or genre may be interested in additional content items or ancillary media assets, as shown in 705, and so the visual element may include recommendations instead of, or in addition to, the control interface 605. As shown in FIGS. 6 and 7, the visual element 605, 705 displayed by the XR device 101 may be driven by the current display 603, 703 provided by the associated app running on the TV 103. The visual element 605, 705 may be a complementary display to the current display 603, 703 on the TV 103, and as the current display 603, 703 changes based on the associated app that controls it, the visual element 605, 705 may correspondingly change to complement the current display 603, 703. For example, the current display 603 in FIG. 6 includes a number of media items that the user may scroll through and the complementary visual element 605 for controlling the current display 603. The visual element 605 displayed by the XR device 101 is a controller that may select, using the XR device, a media item displayed as part of the current display 603 on the TV 103. Then, after a media item has been selected, as shown in current display 703 of FIG. 7, the complementary visual element 705 may provide additional information regarding the selected media item of the current display 703, provide biographical information about performers appearing in the selected media item, show ancillary media assets related or pertaining to the selected media item, or display billing, account or subscription information, advertisements or the like based on the selected media item.

In an embodiment, the system may enable the user wearing the XR device 101 to interact with the TV 103 and/or with the application thus identified and may control the TV 103 and/or the application using the interface of visual element 605. For example, the XR device 101 may select the content item displayed or indicated (as a frame, segment or icon of the content item, or as an EPG showing a listing of the content item or highlighting or otherwise making more prominent the listing of the content item) on the display area of the XR device 101 in this way. If the content item is selected by the user via a gesture including voice or eye gaze activating the controllers of visual element 605, the application, for example, ESPN, associated with the content item may be launched and the content item may be activated on the TV 103. In response, the XR device 101 may continue showing the content item or indication thereof. Or the XR device 101 may discontinue this display of the content item or the indication thereof at this time so that the user may continue to watch the physical TV 103. Thereafter, the XR device 101 may be used to control the physical display 103, including volume, power, input source, channel, contrast, and the like, and to control the applications running or residing on it.

In an embodiment, a "watch on" menu may be dynamically viewed on the XR device 101 based on the physical device 103 detected, or based on the gaze of the user detected by the XR device 101, and a menu item, such as "Watch On Living Room TV" may be shown as more prominent by the displayed menu. In an embodiment the Watch On Living Room TV" may be set as the default option that launches in a few seconds, for example, within 1-90 seconds, unless the user selects another device within that time.

Figure 8:
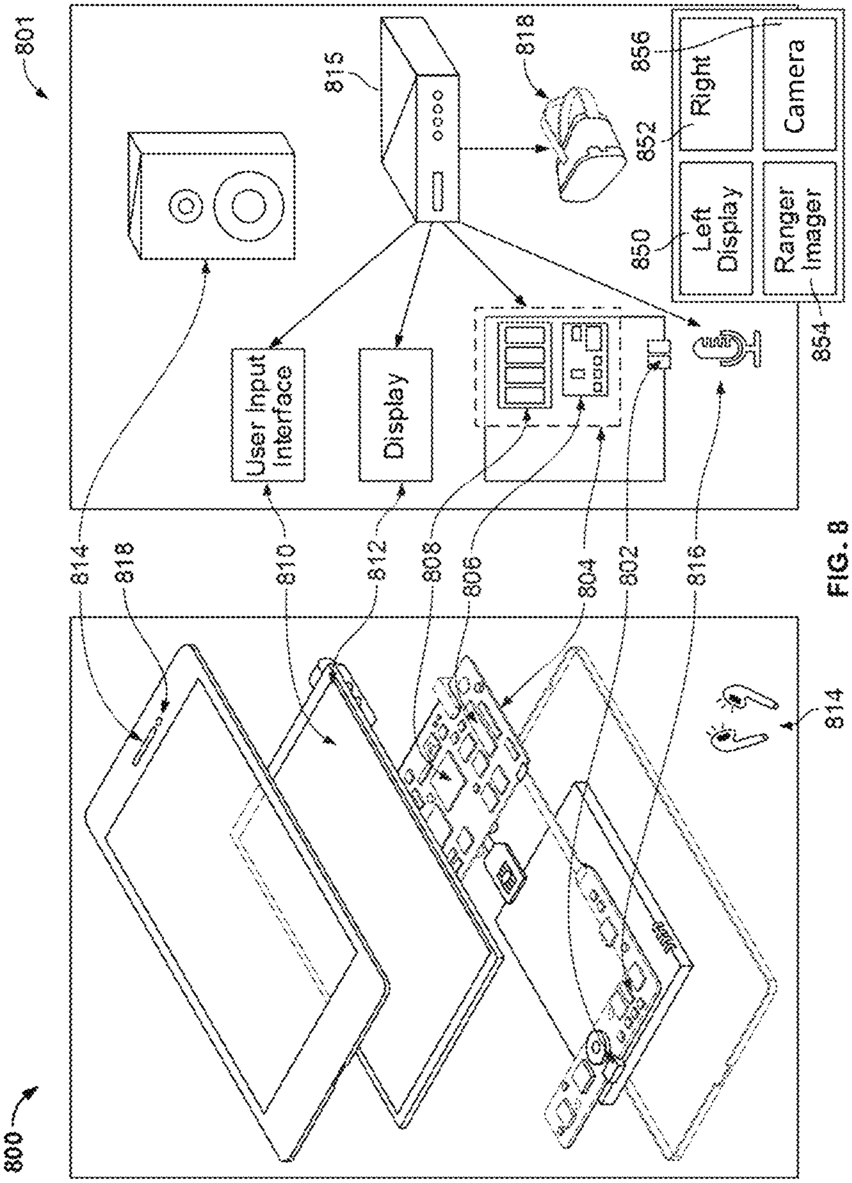
FIG. 8 illustrates a computer system for implementing methods described herein, according to an aspect of the disclosure.

FIG. 8 illustrates an example of an implementation of the computing device 101, including some components thereof, and the XR device 101, which may be provided as HMD 818. A circuit board may include control circuitry, processing circuitry, and storage (e.g., RAM, ROM, hard disk, removable disk, etc.). In some embodiments, the circuit board may include an input/output path for communicating with the HMD 818 of the XR HMD 818 and/or with XR HMD controller 815 as a remote device. Each device 800/801 may receive content and data via input/output (I/O) path 812 that may comprise I/O circuitry (e.g., network card, or wireless transceiver). I/O path 812 may communicate over a local area network (LAN) or wide area network (WAN), for example, via Wi-Fi, Bluetooth, cellular or other wireless or wired connection.

Control circuitry may comprise processing circuitry 820 and storage 822 and may comprise I/O circuitry. Control circuitry may be used to send and receive commands, requests, and other suitable data using I/O path, which may comprise I/O circuitry, for example, for interacting with physical devices, visual elements and remote XR control devices, selecting or otherwise specifying policies for visual elements, determining likely objects of user interest, and for transmitting displays to be provided by the HMD of the XR HMD controller. I/O path may connect control circuitry (and specifically processing circuitry) to one or more communications paths (described below). I/O functions may be provided by one or more of these communications paths, but are sometimes shown as a single path to avoid overcomplicating the drawing.

Control circuitry may be based on any suitable control circuitry such as processing circuitry 820. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i9 processors) or multiple different processors (e.g., an Intel Core i9 processor and an Intel Core i7 processor). In some embodiments, control circuitry executes instructions for various applications, including the XR application, stored in memory (e.g., storage 822). Specifically, control circuitry 808 may be instructed by the XR application to perform the functions discussed above and below. In some implementations, processing or actions performed by control circuitry may be based on instructions received from the XR application.

In client/server-based embodiments, control circuitry 808 may include communications circuitry suitable for communicating with other networks. The XR application may be implemented as software or as a set of executable instructions. The instructions for performing any of the embodiments discussed herein may be encoded on non-transitory computer-readable media (e.g., a hard drive, random-access memory on a DRAM integrated circuit, read-only memory etc.). For example, the instructions may be stored in storage, and executed by control circuitry of a device 800.

In some embodiments, the XR HMD controller may be a client residing on device 808 (e.g., device 800), and a server application may reside on the computing device. Control circuitry may include communications circuitry suitable for communicating with a server, XR equipment controller 1921 and devices, a table or database server, or other networks or servers. Such communications may involve the Internet or any other suitable communication networks or paths. In addition, communications circuitry may include circuitry that enables peer-to-peer communication of user equipment devices, or communication of user equipment devices in locations remote from each other (described in more detail below).

Memory may be an electronic storage device provided as storage 822 that is part of control circuitry. As referred to herein, the phrase "electronic storage device" or "storage device" should be understood to mean any device for storing electronic data, computer software, or firmware, such as random-access memory, read-only memory, hard drives, optical drives, digital video recorders, solid state devices, quantum storage devices, gaming consoles, or any other suitable fixed or removable storage devices, and/or any combination of the same. Storage 822 may be used to store various types of content described herein. Nonvolatile memory may also be used (e.g., to launch a boot-up routine and other instructions).

Control circuitry 808 may include video generating circuitry and tuning circuitry. Control circuitry may also include scaler circuitry for upconverting and down converting content into the preferred output format of equipment 800. Control circuitry may also include digital-to-analog converter circuitry and analog-to-digital converter circuitry for converting between digital and analog signals. In some embodiments all elements of system 800 may be inside housing of the XR display device. In some embodiments, XR HMD display device 818 comprises a camera 856 (or a camera array or LiDAR—Light Detection and Ranging), and may be a SLAM-enabled device. Video cameras may be integrated with the equipment or externally connected. One or more of cameras may be a digital camera comprising a charge-coupled device (CCD) and/or a complementary metal-oxide semiconductor (CMOS) image sensor. In some embodiments, one or more of cameras 856 may be dirtied at outside physical environment (e.g., two cameras may be pointed out to capture to parallax views of the physical environment). In some embodiments, XR HMD 818 may comprise one or more biometric sensor or sensors to measure eye rotation (e.g., electrodes to measure eye muscle contractions), head movement and thus user gaze. HMD 818 may also comprise range image 854 (e.g., LASER or LIDAR) for computing distance of devices by bouncing the light of the objects and measuring delay in return (e.g., using cameras 856). In some embodiments, HMD 818 comprises left display 850, right display 850 (or both) for generating VST images.

The XR HMD controller 1921 may be implemented using any suitable architecture. For example, it may be a stand-alone application wholly-implemented on each one of user equipment device 800 and user equipment device 801. In such an approach, instructions of the application may be stored locally (e.g., in storage 808), and data for use by the application is downloaded on a periodic basis (e.g., from the edge service network, from an out-of-band feed, from an Internet resource, or using another suitable approach). Control circuitry may retrieve instructions of the application from storage 808 and process the instructions to provide XR generation functionality and perform any of the actions discussed herein. Based on the processed instructions, control circuitry may determine what action to perform when input is received from user input interface 810. For example, head movement or movement of a hand or handheld device via user input interface 810. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the XR application may be downloaded and interpreted or otherwise run by an interpreter or virtual machine (run by the control circuitry). In some embodiments, the XR application may be encoded in the ETV Binary Interchange Format (EBIF), received by control circuitry as part of a suitable feed, and interpreted by a user agent running on control circuitry. For example, the XR application may be an EBIF application. In some embodiments, the XR application may be defined by a series of JAVA-based files that are received and run by a local virtual machine or other suitable middleware executed by control circuitry. Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 602-11x, etc.), or other short-range communication via wired or wireless paths. The user equipment devices may also communicate with each other directly through an indirect path via communication network.

Although communications paths are not always drawn between devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network. In an embodiment, a handheld device may be part of, or connected to the HMD 818 in a wired or wireless manner to control physical devices or visual elements.

Figure 9:
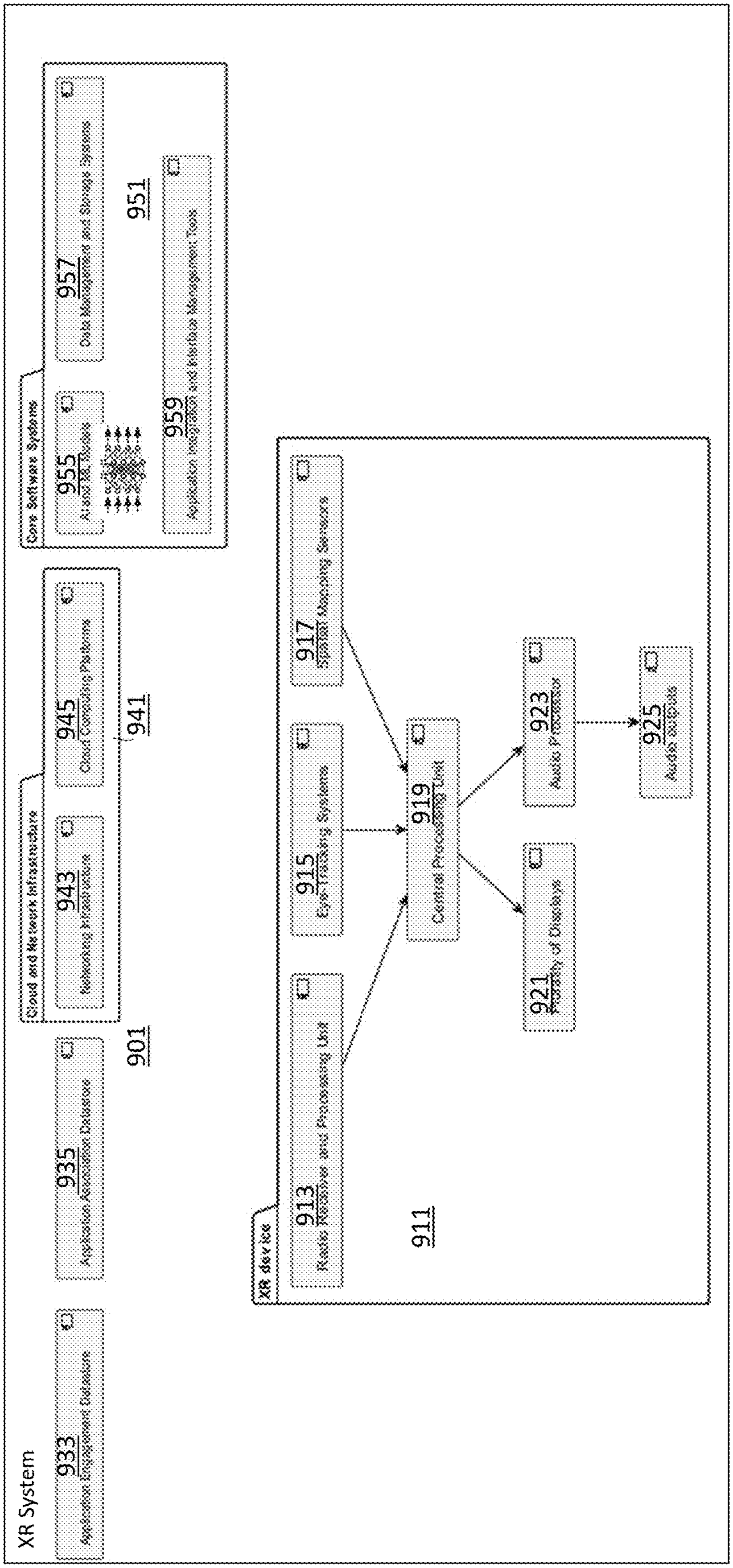
FIG. 9 is a schematic representation of a components of an XR system, according to an aspect of the disclosure.

FIG. 9 shows components of a system according to an aspect of the present disclosure. An XR device 911, such as a head mounted device or smart glasses, may include a radio receiver and processing unit 913 in communication with a Wi-Fi based wireless router or another network, eye-tracking systems 915 which may control cameras for tracking eye HMD user movements, and spatial mapping sensors 917 which may include LIDAR and may be SLAM enabled. Two or more displays 921 an audio processor 923 for receiving the verbal commands and other oral audio input from the user and an audio output system 925 may also be included in the XR device 911. A central processing unit 919 of the text our device may perform their processing functions for to support the various components of the XR device 911.

XR device 911 may be in communication via cloud and network infrastructure 941 with other systems, including core software systems 951. Core software systems 951 may include a SLAM network edge for monitoring and storing mapping information for the XR device 911 and other devices in the physical space of the XR device 911. Core software systems 951 may also include an AI and machine learning model 955 for determining the XR device wearer's likelihood of interacting with a potential object of focus, data management and storage systems 957 for maintaining user profiles for XR device wearers and other information, and application integration and interface management tools 959 for interacting with physical devices that are or may become objects of user focus and apps that are running or are associated therewith.

The core software systems 951 may communicate via the cloud and network platform 941 with application and engagement data store 933 associated with the physical devices. Upon successful identification of a physical device as the object of focus, the system queries an association database 935 to find related applications or groups of applications.

In an embodiment, this database includes predefined criteria for associations, which may be based on item type, usage patterns, brand, or other relevant factors. If no applications are found for the physical object, in some embodiments, the system may query an application store to discover applications which may be associated with the item and to suggest a subset of XR applications for the user to acquire and install.

Once an application corresponding to the physical device is identified, the user may be presented with an option to associate the application with the item, just for a current session or in general also for future sessions, and to associate the physical device's location spatial anchor on or near the physical device that is the object of user focus. The user may be able to move the icon in relation to the spatial anchor or to change the spatial anchor for the device. Additionally, the system may enable the XR device user to choose an application from a plurality of available applications and directly associate it with a spatial anchor, for example, if no app is detected.

Figure 10:
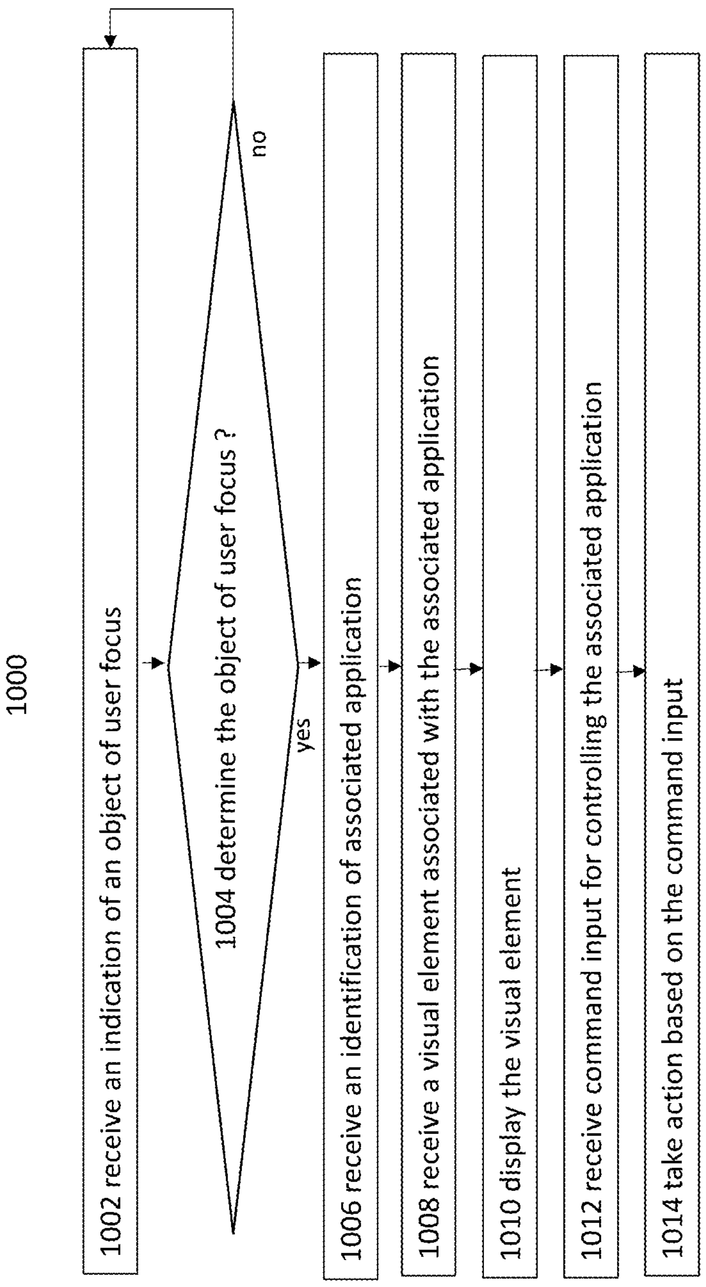
FIG. 10 illustrates a process for visual element display and control based on object of focus determination, according to an aspect of the disclosure.

FIG. 10 is a flowchart showing a process 1000 for determining an object to user focus and to provide a visual element in association therewith. The process 1000 may be implemented, in whole or in part, by the systems shown in FIG. 8 or 9. One or more actions of the process 1000 may be incorporated into or combined with one or more actions of any other process or embodiments described herein. The process 1000 may be saved to a memory or storage (e.g., the storage of the system shown in FIG. 8) as one or more instructions or routines, which may be executed by any suitable device or system having access to the memory or storage to implement the process 1000.

At 1002, an indication of an object of user focus is received by the system. For example, the user's gaze may be detected as focusing on an object within the field of view of the XR device.

At 1004, it is determined whether the object is set as the object of focus. Rules and policies may be accessed for determining whether the candidate object is set as the object of focus. For example, it may be determined whether the user's gaze was detected as focusing on the physical device for a threshold period of time and/or a user's viewing history may be accessed to determine whether the user is likely to turn on the television at this time.

If the physical device is set as the object of focus, then at 1006, an identification of one or more associated applications are received. For example, the associated application may be an application currently running on the object of focus or may be available on the object of focus.

At 1008, visual elements associated with the associated application may be generated or received. At 1010, the visual element is displayed by the XR device. The visual element is displayed in association with or proximate the object of focus.

At 1012, a command may be received for controlling the associated application. The command may be provided as a gesture input to virtual controller shown by the visual element. At 1014, an action based on the command received is executed.

Figure 11:
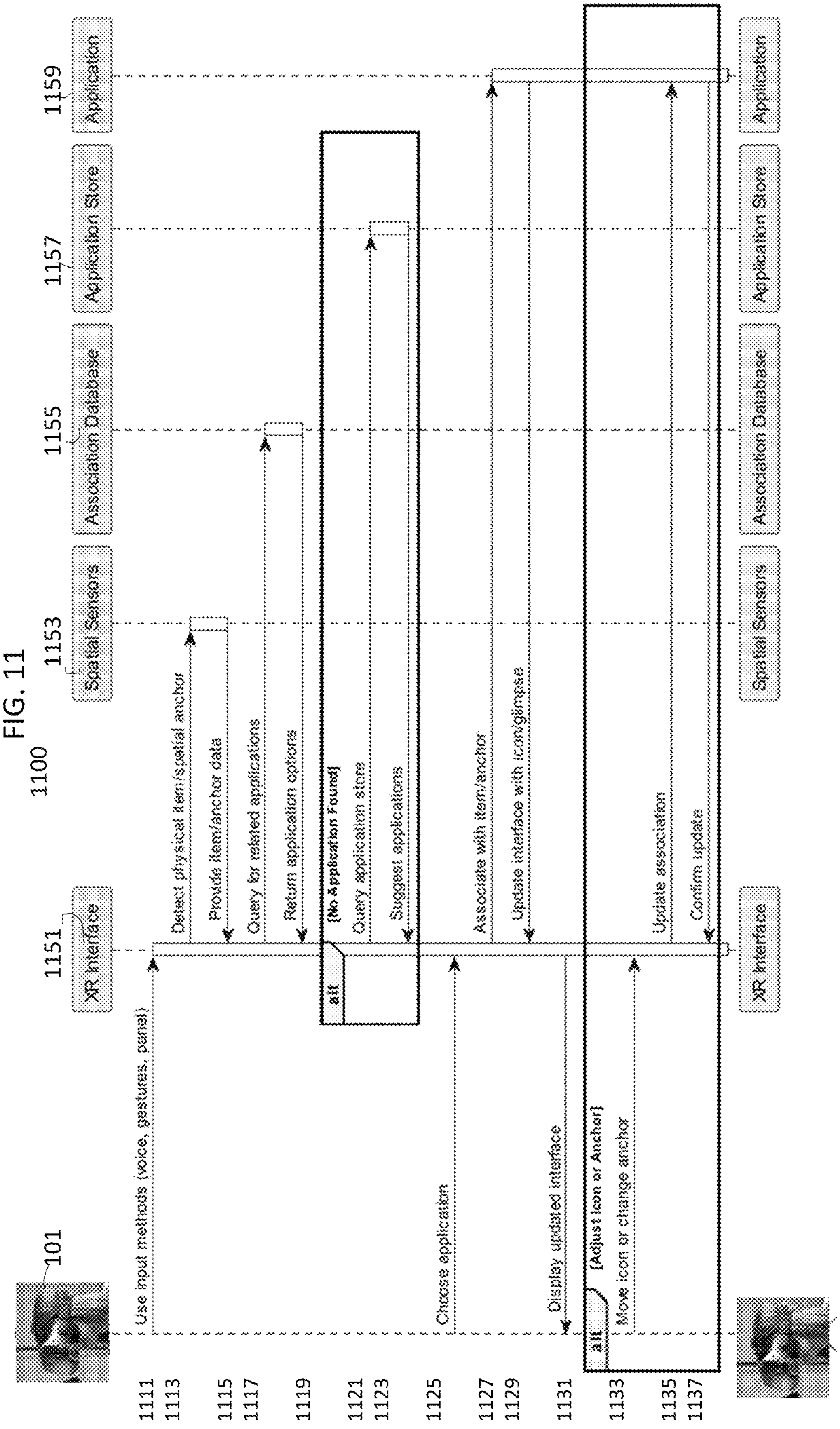
FIG. 11 is a communication flow diagram between components showing an example of processing for object of focus determination and associated application selection, according to an aspect of the disclosure.

FIG. 11 illustrates an aspect of a system according to the present disclosure. An XR device interface 1151 may receive various inputs, such as voice commands, hand gestures, or a virtual control panel, from the XR device 101. The XR interface 1151 may enable a user of the XR device 101 to select and to associate interactively detected physical items visible in their environment and/to select and associate manually placed spatial anchors associated with an application or group of applications. Utilizing the XR device's array of spatial sensors, including cameras and depth sensors, the system places these anchors in the XR space. These spatial anchors may serve as reference points for contextually displaying the associated application icons or other visual element within the XR interface.

Additionally, this XR interface 1151 may enable users to manage the placement of application icons and other visual elements within the XR environment. The XR interface 1151 may facilitate this process by either allowing direct interaction with the physical device in a "pass-thru" mode, with a virtual representation of the physical device, with a virtual representation of a placed or "pinned" spatial anchor, or by providing a navigable menu that lists detected items alongside corresponding or associated applications installed on the XR device or available for installation from an application store.

As shown in FIG. 11, at 1111 the XR interface 1115 receives from the XR device 101 inputs, including voice inputs, hand gestures, or other inputs via panel or handheld device associated with the XR device 101. At 1113, the XR interface 1151 may detect spatial anchors associated with a physical device. At 1115, based on the spatial sensors of the XR device 101 and the known coordinates of the physical device the physical device may be identified.

At 1117, the system may query the association database 1155 for applications associated with the physical device identified. Association database 1155 may contain a list of applications running or available on the physical device identified. For example, association database 1155 may store a list of apps that have been downloaded by the physical device. The apps associated may also be determined in other ways, for example, by querying the physical device or by checking online resources for apps potentially available with the physical device.

At 1119, the association database 1155 returns to the XR interface 1151 associated applications running or available on the physical device. At 1121, the XR interface 1151 may query application store 1157 for associated applications. For example, if the association database 1155 returns no associated applications or returns apps deemed not to be relevant, then the XR interface 1151 may query application store 1157 for applications associated with the physical device. At 1123 application store 1157 replies to the request by returning suggested applications to XR interface 1151.

At 1125, based on user input, the XR device 101 may transmit an identifier of the selected application to XR interface 1151. For example, the user may choose the ESPN icon that was caused to be displayed by the XR interface 1151 on or near the TV. In response to this selection, at 1127 XR interface 1151 may associate the physical device with the application selected. In response, at 1129 the XR interface 1151 may receive an update based on the application 1159. For example, instead of, or in addition to, the ESPN icon being displayed, the visual elements now being displayed may include media content, such as a game currently being shown on ESPN, or a recommendation for an upcoming show, a photo or biographical information about an athlete being featured in future content or the like. Accordingly, at 1131 the display is updated for the XR device 101.

At 1133, the user XR device 101 may transmit user input information to the XR interface 1151. For example, the user input may comprise one or more commands for changing the display provided as the visual element, or for playing a content item identified in the visual element. The user input may also indicate a change in a location of the visual element requested by the user. At 1135, in response to the user command, the XR interface 1151 requests the application 1159 to make the change. At 1137, the update is confirmed by application 1159 to the XR interface 1151.

Figure 12:
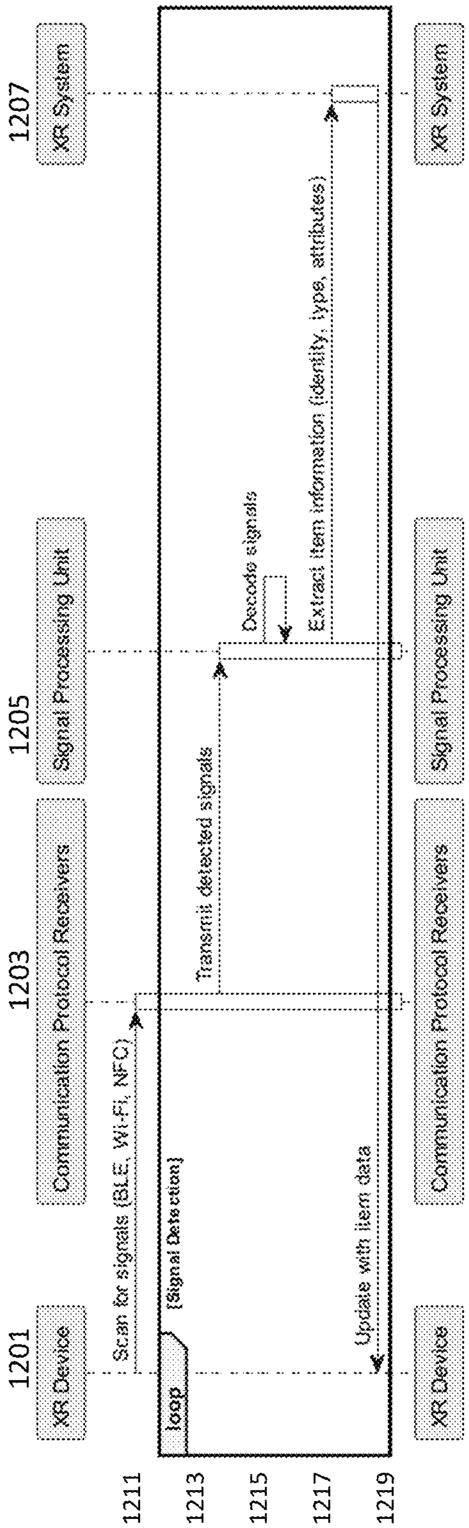
FIG. 12 is a communication flow diagram between components showing an example of processing for detecting proximity to a physical device and for identifying it and attributes thereof, according to an aspect of the disclosure.

In an embodiment illustrated in FIG. 12, the system may make use of transceivers for communication protocols, such as Bluetooth Low Energy (BLE), Wi-Fi or Near-Field Communication (NFC) or the like, to detect and interpret signals broadcast or affected by physical items within their environment to detect proximity or to guide and enhance the visual elements providing capabilities of the XR device 101. When incorporating these transceivers, at least one signal processing unit within the XR system may decode these signals to extract relevant information, such as the item's identity, type, and other attributes that the item may be broadcasting.

As shown in FIG. 12, at 1211 the XR device 1201 may scan for signals to detect physical devices in the physical space. Physical devices that are communication protocol receivers 1203 may transmit detected signals to signal processing unit 1205 in response to the request received from XR device 1201. Signal processing unit 1205 may decode the signals received from the communication protocol receivers 1203 and may transmit to XR system 1207 information identifying the physical devices and their types and attributes. In response, XR system 1207 may return to the XR device 1201 the information about the physical devices and their locations.

Figure 13:
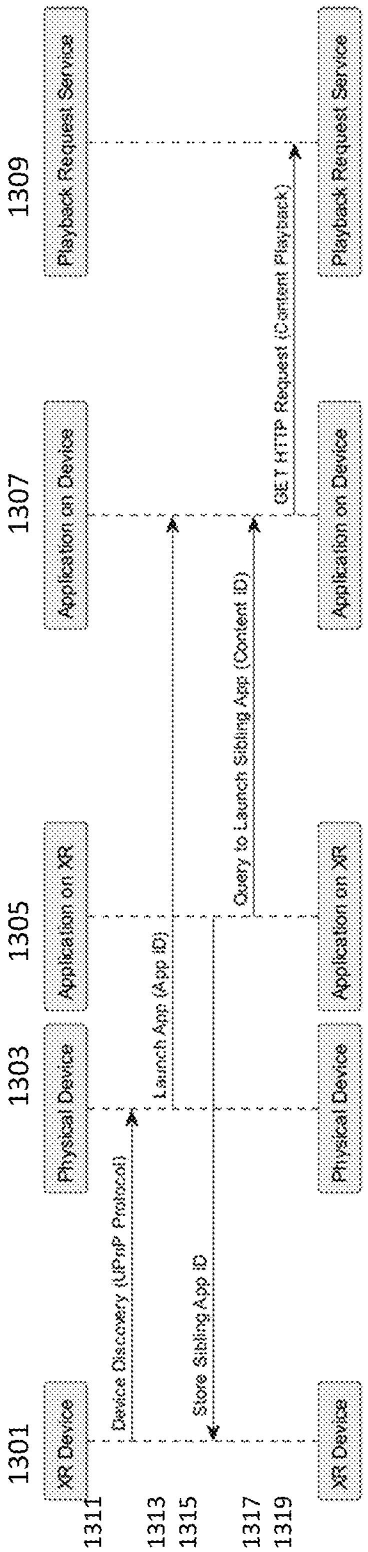
FIG. 13 is a communication flow diagram between components showing an example of processing for application and sibling application discovery, according to an aspect of the disclosure.

In an embodiment shown in FIG. 13, a physical device discovery process may use existing device discovery protocols such as Universal Plug and Play (UPnP) to query the physical device to launch an app ID that is associated with an Over-the-top (OTT) media service. For example, a Netflix app installed on the TV is a "sibling app" to the Netflix app installed on the XR device. The XR app may store the ID of the sibling app and use this ID in the discovery and launch process. A subsequent query to the sibling app may include launching the particular content item for playback by passing a content ID to the sibling playback request service so that it can perform a GET Hypertext Transfer Protocol (HTTP) request to trigger playback of the desired content item.

As shown at 1311, the XR device 1301 may transmit a device discovery request to physical device 1303. In response, at 1313, the physical device 1303 may launch an application on the physical device 1307. At 1315, the XR device 1301 may store a sibling ID of the app that had been indicated at 1313 by the physical device 1303. In an embodiment, the application may be launched as a background application and the physical device 1303 does not display or respond as it would normally to the application that is launched.

At 1317, the application on the XR device 1305 may request the application on the physical device 1307 to launch the app. The application on the device 1307 may then request content playback from playback request service 1309.

Figure 14:
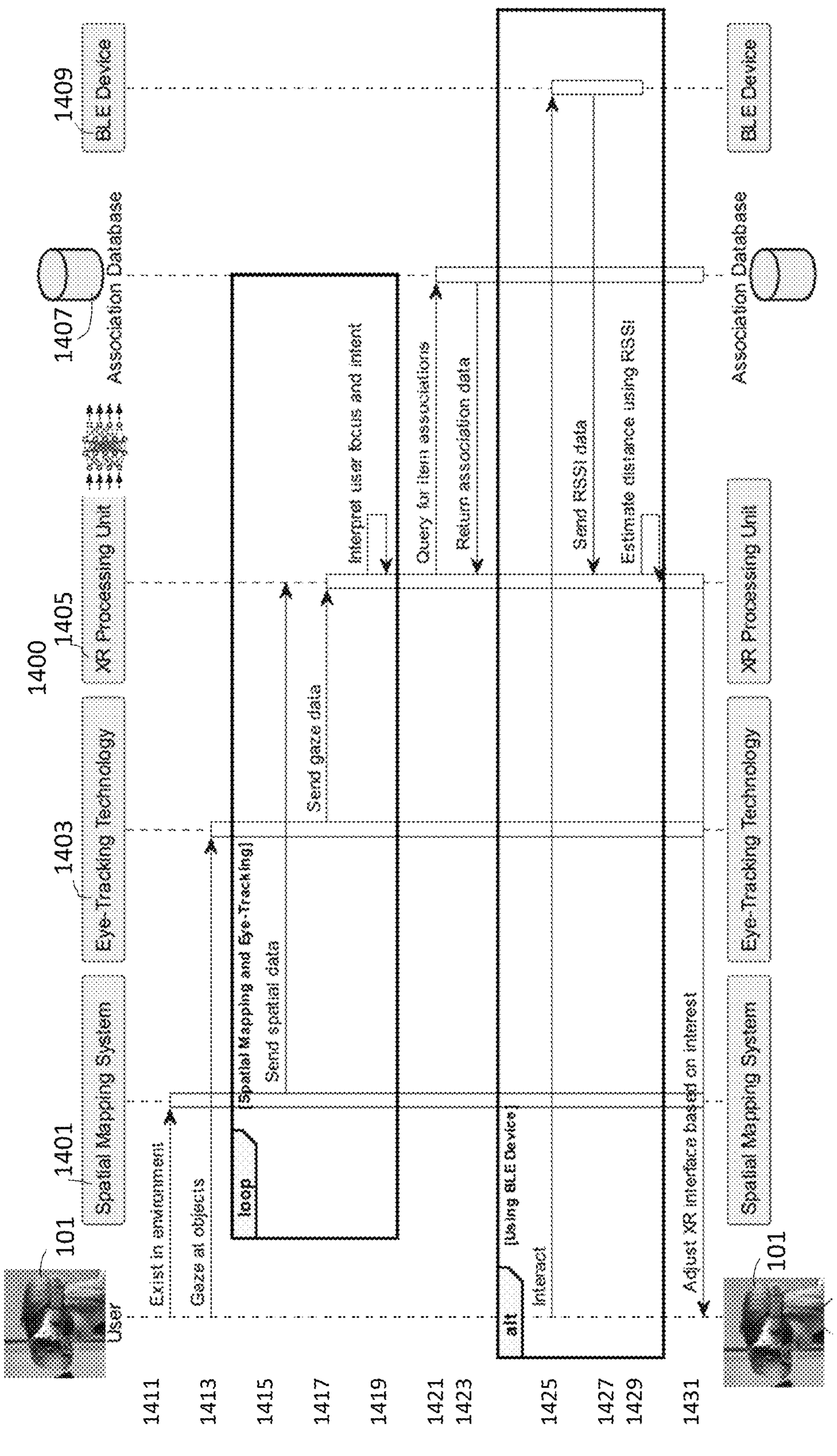
FIG. 14 is a communication flow diagram between components showing an example of processing for determining an object of user focus, according to an aspect of the disclosure.

In an embodiment illustrated in FIG. 14, the system's spatial mapping system may continuously scan the surrounding physical space, mapping out the physical layout and pinpointing the XR device's position relative to various physical objects. Eye-tracking technology may be employed to track where the user is looking, providing data about their gaze focus. The XR system's processing unit, possibly in conjunction with AI or ML models, interprets the data collected from these sensors. It may determine the XR device user's intent or interest by analyzing proximity to, and focus on, different physical objects and on visual elements associated with the physical device and its apps. Proximity may be gauged by the spatial mapping system, which calculates the distance between the user and the objects using depth information. For objects emitting signals like Bluetooth Low Energy (BLE), proximity may be measured using the Received Signal Strength Indicator (RSSI) to estimate distance. Upon identifying the user's interest in, or focus on, a particular physical device, the system may consult a database containing associations between physical devices and XR applications. This database, which may reside on the XR device or in a cloud service, may include mappings informed by various criteria, such as, by way of illustration, physical item identifier, physical item metadata, physical item spatial anchor location, associated XR application identifiers or application group identifiers, associated application launch icon identifiers, associated application data API (visual element or "glimpse" API) identifiers, associated application launch icon spatial anchors, and physical item application engagement data. This database may be dynamically updated, reflecting new user interactions and preferences, thereby maintaining the relevance of application associations.

As shown in FIG. 14, at 1411 the XR device 101 enters a physical space which is signaled to the spatial mapping system 1401. At 1413, the user gaze may be detected using eye tracking technology 1403. Based on the spatial mapping determined, at 1415 spatial data may be transmitted to XR processing unit 1405. Also, the same data may be transmitted to XR processing unit 1405, at 1417. At 1419, XR processing unit may determine or predict user focus on a particular physical device or on the visual elements displayed in connection therewith.

At 1421, XR processing unit 1405 may query association database 1407 for the physical device associated with the location identified at 1423. The XR processing unit 1405 may receive an associated physical device identifier, including an identification of its functions and apps associated therewith.

The XR device 101, at 1425, may interact with the physical device 1409 so identified. In response to a request from the XR device 101 to the physical device 1409 (shown as Bluetooth device in this example), at 1427 the physical device may transmit to the XR processing unit 1405 received signal strength indicator (RSSI) data. Based on this RSSI data, the XR processing unit 1405 may estimate a distance to the physical device 1409. At 1431, the XR processing unit 1405 may adjust the XR device interface based on the interest of the user earlier determined.

In an embodiment, the item detection may include a physical item. For example, if the system detects a book, it may identify detailed attributes, such as the title of the book, by employing various AI or ML algorithms such as image recognition and text extraction. In some cases, the system could extend this inferred information by utilizing an Internet search tool to acquire further information about the item. This identified subset of information—such as the book's title or an ISBN number retrieved from an Internet search of the inferred book's title—may be transferred to the application that is being launched or brought to the foreground. For instance, if a reading or reference application is launched in response to the book detection, the title of the book or ISBN number may be passed to the application. This allows the application to present content or information that is directly relevant to the book in question, enhancing the user's experience by maintaining context and relevance.

Figure 15:
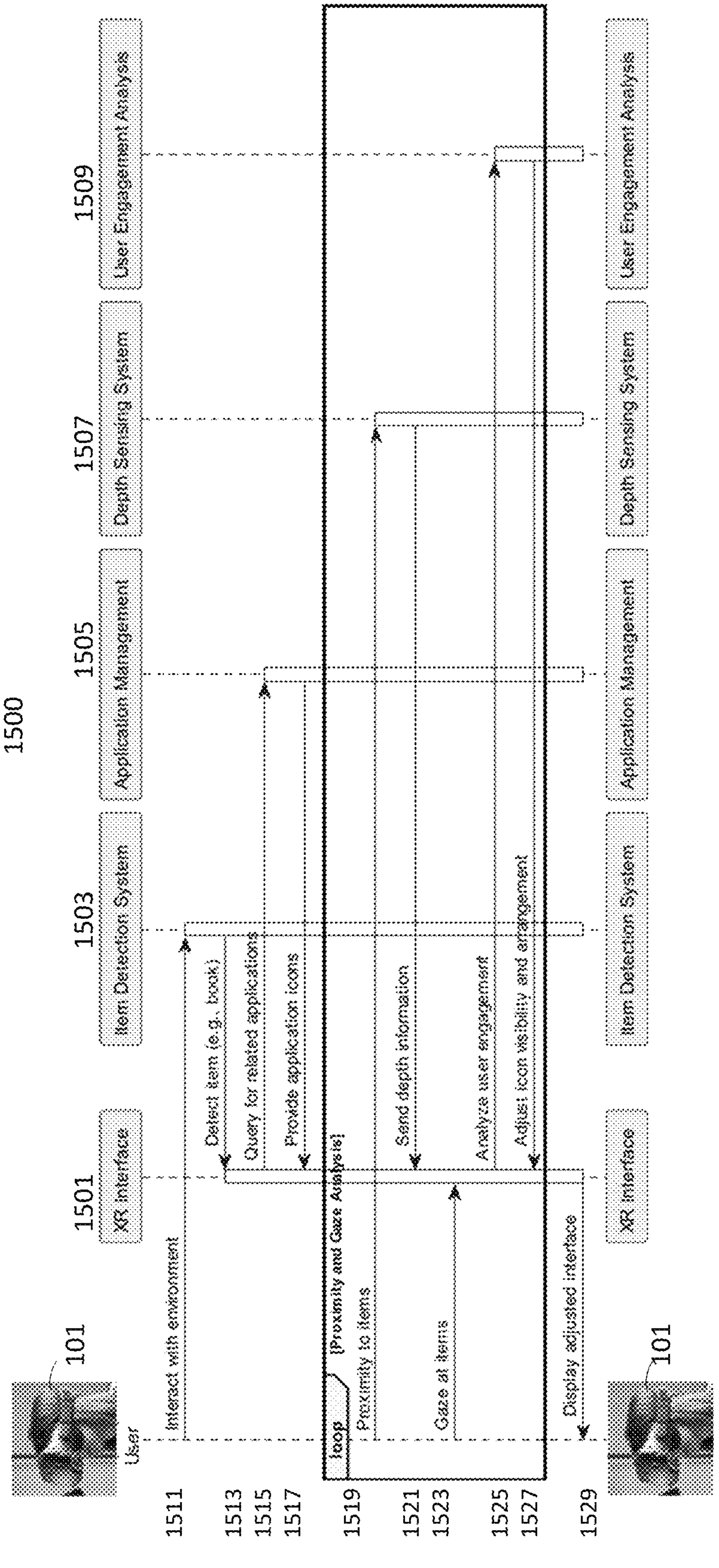
FIG. 15 is a communication flow diagram between components showing an example of processing for selecting icons or other visual elements associated with an application of the object of focus and for adjusting visibility of the visual elements, according to an aspect of the disclosure.

In an embodiment shown in FIG. 15, when the system identifies a particular object of likely interest in the user's environment, it may trigger a contextual response in the XR interface. Based on the identification of the object of focus and its association with specific applications or groups of applications, the system may dynamically adjust the visibility and arrangement of relevant application launch icons. For example, if the user focuses on a book, the system may display icons for reading-related applications or hide unrelated ones to reduce visual clutter. The system may use optical character recognition (OCR) or other technologies to read the title and/or author or other identifying information about the book. The information may include the ISBN or barcode. For other objects, the information captured by the XR device 101 from the object may include SKU number, model number or name, or product number, vehicle or registration number of the like. Based on such information, the system may search for, and retrieve, information about the book. The retrieved information may be displayed as visual elements by the XR device 101. The system may consider previous user engagement, length of gaze (e.g. a gaze vs a quick look), time of day, or other external factors to influence how and when application icons or information are displayed to the user within the XR interface.

As shown at 1511 of FIG. 15, XR device 101 is detected in a physical space. Item detection system 1503 may first detect user focus on a physical object and, at 1513, may transmit an indication of the physical object of focus to the XR interface 1501.

At 1515, XR interface 1501 may query application management 1505 for applications associated with the object of focus determined by item detection system 1503. At 1517, application management 1505 identifies applications associated with the object of focus and may provide to XR interface 1501 visual elements for the application.

At 1519 a proximity and gaze analysis process is started. In particular, at 1519, proximity of the XR device 101 to the object of focus, which may be a new object of focus, is detected by depth sensing system 1507. In response, at 1521, depth sensing system 1507 transmits depth data to the XR interface 1501. At 1523, user gaze data detected at the XR device 101 is transmitted to the XR interface 1501. At 1525, the XR interface 1501 analyzes user engagement with the object of focus and transmits data accordingly to user engagement analysis 1509. In response, user engagement analysis 1509, at 1527, adjusts icon or visual element visibility and arrangement as necessary. At 1529, XR interface 1501 adjusts the display of the XR device 101 accordingly.

In an embodiment, such dynamic adjustment of application icons may be based on object detection but also on considerations of the user's proximity to the detected items. The system utilizes depth information to calculate the distance between the XR device 101 and the detected object of focus. In this embodiment, closer objects of interest may trigger display of a visual element more prominently, while icons or other visual elements related to distant objects of interest might be minimized or hidden. This proximity-based adjustment may make for a more intuitive user interface relevant to the user's current context and needs. As the user moves through the environment or shifts attention, the system may continuously update the display and arrangement of application launch icons and "glimpses" (visual elements). In some cases, the application icon may be adjusted to match the ambient environment such as the surface characteristics on which the physical object of focus is located.

Figure 16:
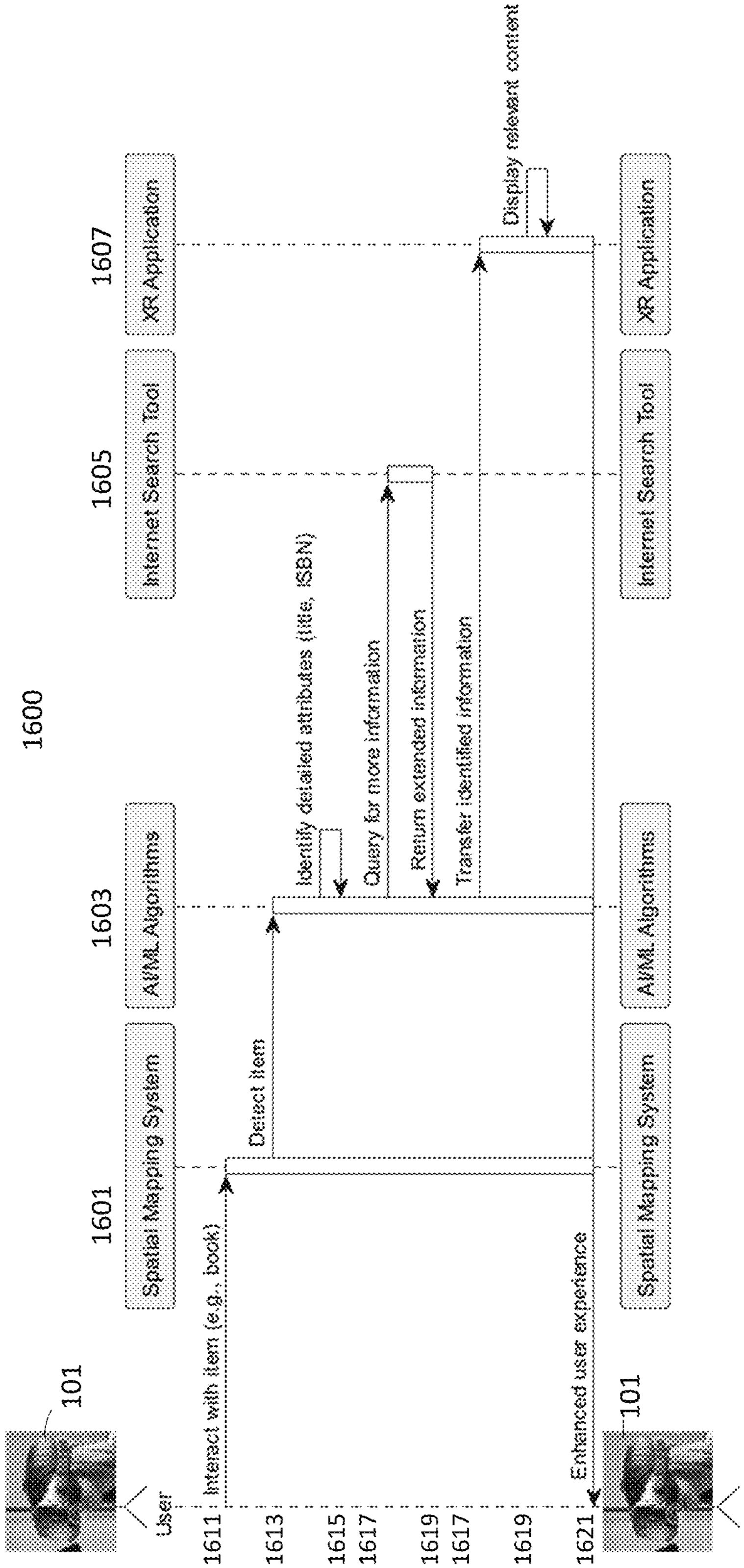
FIG. 16 is a communication flow diagram between components showing an example of processing for obtaining and displaying information about a physical object, in this case printed matter, which is an object of focus, according to an aspect of the disclosure.

In an embodiment shown in FIG. 16, at 1611 a spatial mapping system 1601 receives information indicating that the user of the XR device 101 is interacting with a physical item, such as a book. At 1613, data indicating the detected physical item is transmitted to an algorithm controller 1603, which may include a trained machine learning model for identifying the physical item. At 1615, and attribute related to the identified item, such as the title of the book or ISBN of the book, an issue and volume number of a periodical, a model number, barcode, stock keeping unit code (SKU), and/or identification of a manufacturer of an item, or the like, is identified by the trained machine model or other algorithm.

At 1617, additional information about the identified item, based on the attribute extracted at 1615, is transmitted to an Internet search tool 1605. One or more keywords or other search terms associated with the identified item may be selected for the search. At 1619, the information retrieved by the Internet search tool 1605 is transmitted to the algorithm processor 1603. For example, the information retrieved may be biographical information about an author or bibliographic information for a book identified, a user's manual service, or warranty information for an item identified, or the like.

At 1617, the information thus identified is transmitted to the XR application 1607. At 1619, relevant content based on their retrieved information is generated for display. At 1621, the XR device receives data for displaying the content thus identified.

Figure 17:
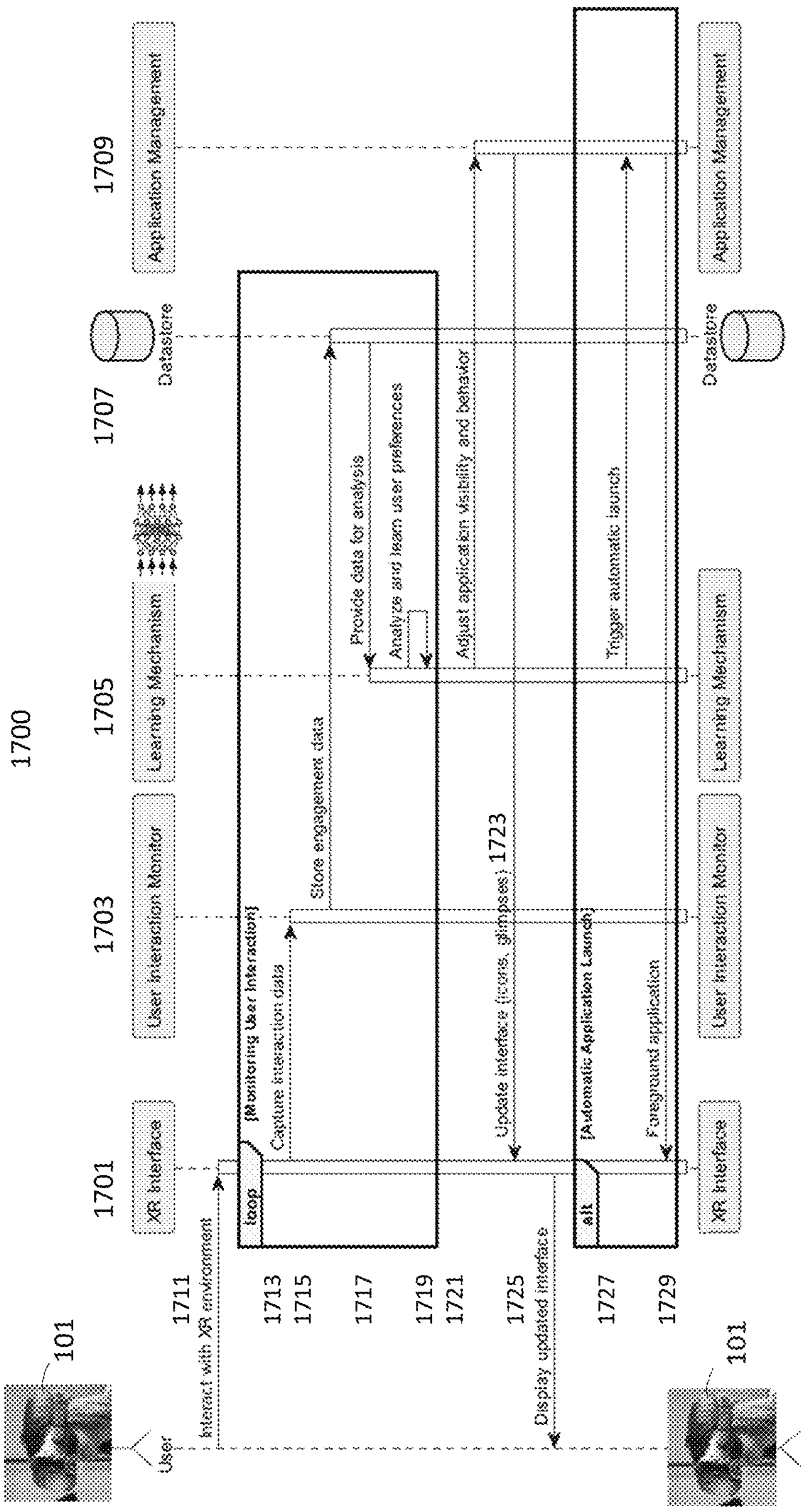
FIG. 17 is a communication flow diagram between components showing an example of processing for capturing and storing user interest and preference data that may be used for identifying an object of focus and for adjusting application behavior, according to an aspect of the disclosure.

In an embodiment shown in FIG. 17, the system incorporates a machine learning model or other pattern identification technique to observe user interactions and preferences over time to refine user engagement associations. For example, if a user is periodically presented with an application associated with a smart thermostat, and the user repeatedly does not interact with the presented application, the system may learn to show a visual element associated with the application less often than visual elements of other applications with which a user may interact more frequently. As such, the user's engagement with a specific physical item, spatial anchor, associated application, application launch icon, or glimpse is monitored and persisted in a datastore. Based on the learned user's engagement over time, the corresponding application launch icon or glimpse may be adjusted visually within the XR interface. In some cases, an associated application may be automatically launched or foregrounded to provide immediate and intuitive access.

At 1711 of FIG. 17, user interaction with the surroundings detected by XR device 101 is transmitted to the XR interface 1701. At 1713, the XR interface transmits the interaction data to user interaction monitor 1703. User interaction monitor 1703, at 1715, transmits the user interaction data to datastore 1707. At 1717, datastore 1707 transmits this user interaction data to the learning mechanism 1705. Or, user interaction monitor 1703 may transmit the user interaction data to both the data store 1707 and to the learning mechanism 1705.

At 1719, learning mechanism 1705 may analyze the user interaction data together with previous user interaction data to discern user interaction patterns with the physical device, its apps and/or with visual elements associated with the physical device and its apps. At 1721, the visual elements and their behavior and/or the applications associated with the physical device may be adjusted and this may be instructed by learning mechanism 1705 to application management 1709. At 1723, application management 1709 updates XR interface 1701 according to the data received at 1717. At 1725, XR interface 1701 updates the display provided by the XR device 101 according to the update 1719 received from application management 1709. At 1727, learning mechanism 1705 triggers an automatic launch of the relevant application, according to the discerned pattern determined earlier, to application management 1709. 1729, application management 1709 foregrounds the application accordingly to XR interface 1701.

One or more sensors may be positioned in, on, or at the XR device to capture a field of view of the XR device. The system may have a map of items in a physical space using SLAM (Simultaneous Location and Mapping) technology. A map of an area may be generated based on sensor data captured by sensors onboard the SLAM-enabled device, for example, on the XR device 101, and the location of the SLAM-enabled device on the map may be determined based on data generated by the device. If provided as a SLAM-enabled device, the XR device may be equipped with an IMU (inertial measurement unit). IMU data may be used for location/orientation/movement determination. A SLAM network edge service may determine a distance of the SLAM-enabled device, such as the XR device 101, or a change in distance of the SLAM-enabled device, to one or more neighboring physical objects. A SLAM network edge may handle some of the mapping or other processing necessary to generate the map of physical objects in the physical space. The SLAM network edge service may also enable the XR device 101 to position the virtual icons, images, content items, or virtual objects to be seen by the XR device 101. Other spatial mapping approaches for learning the positions of physical objects in the space are also contemplated. A visual positioning system (VPS) may be used to determine the position and orientation of every user wearing XR equipment.

FIGS. 18A-18D are a high-level distributed mapping system that is based on distributed/shared SLAM systems. Each device's location may be calculated by the localization function in the SLAM system. The location for any device may be shared to any other device, and in particular, the location of the physical devices in a physical space may be shared with the XR system as needed to determine the object of user focus. The distributed SLAM system may be running in the cloud or the system may be localized to the home and property of the user. Since the XR device may be the only device requiring application icon and glimpse overlays, the XR headset may store an x, y and z offset for a visual element from the object of user focus. The visual element offset may be calculated for the spatial anchors anchored relative to the physical device.

In an embodiment, the XR device 101 may determine whether to provide a single visual element for two related devices, such as an autonomous robot, for example, an autonomous vacuum cleaner or lawn mower, and the charging base for an autonomous device. Since the visual element may be spatially anchored to each device, the visual element may always be shown relative to the XR stored device spatial anchor offsets. This example system uses offsets for both static and mobile devices, as discussed herein.

Figure 18A:
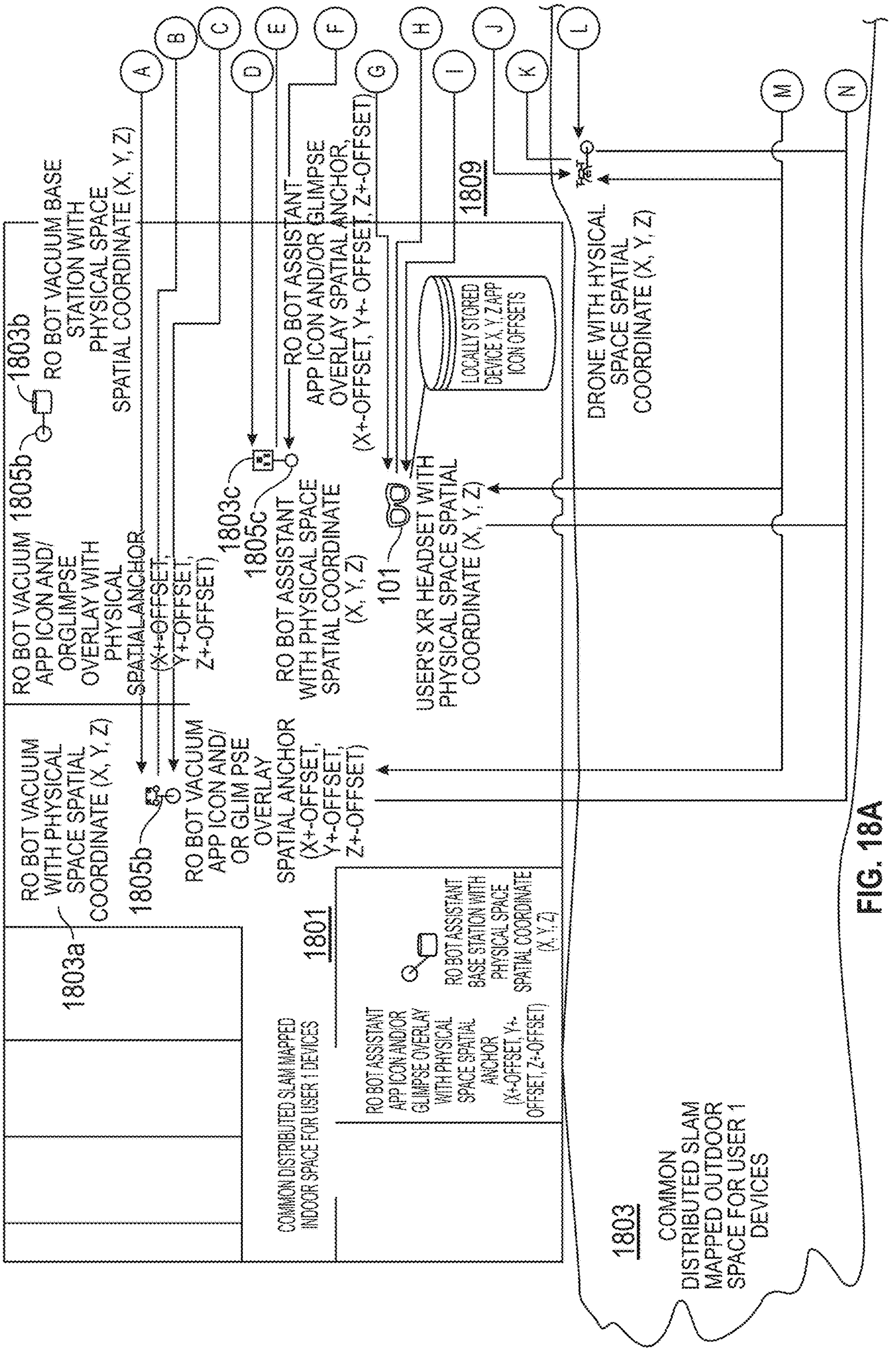
FIG. 18A-18D illustrate a SLAM system for localizing and mapping physical devices in a physical space, according to an aspect of the disclosure.

As shown in FIG. 18A, a physical space may include an indoor space 1801 and an outdoor physical space 1803. An autonomous robot vacuum cleaner 1803*a* located currently at the indoor physical space 1801 at a first set of coordinates may have an associated visual element 1805*b* at an offset from the first coordinates. A charging base 1803*b* for the autonomous robot vacuum cleaner 1803*a* located at a second set of coordinates may have a visual element associated therewith at and offset from the second coordinates. A third device associated with the autonomous vacuum cleaner 1803 may be a robot assistant 1803*c* located at a third set of coordinates. A visual element associated with the robot assistant 1803$c$ may be located at an offset from the third coordinates. Physical device coordinates and their visual element offsets may be stored locally in a database 1809 to facilitate physical device identification and visual element placement.

Figure 18B:
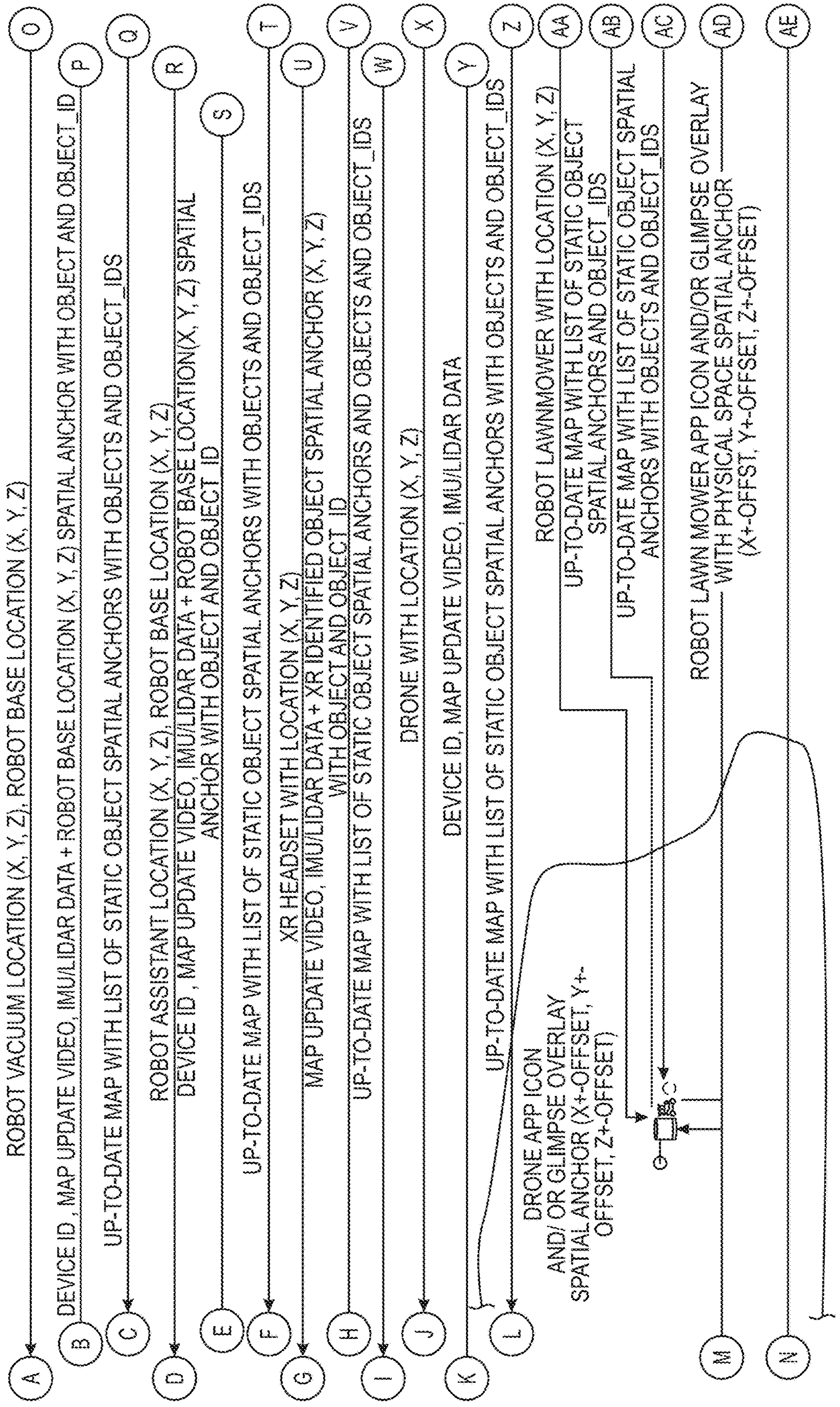
Figure 18C:
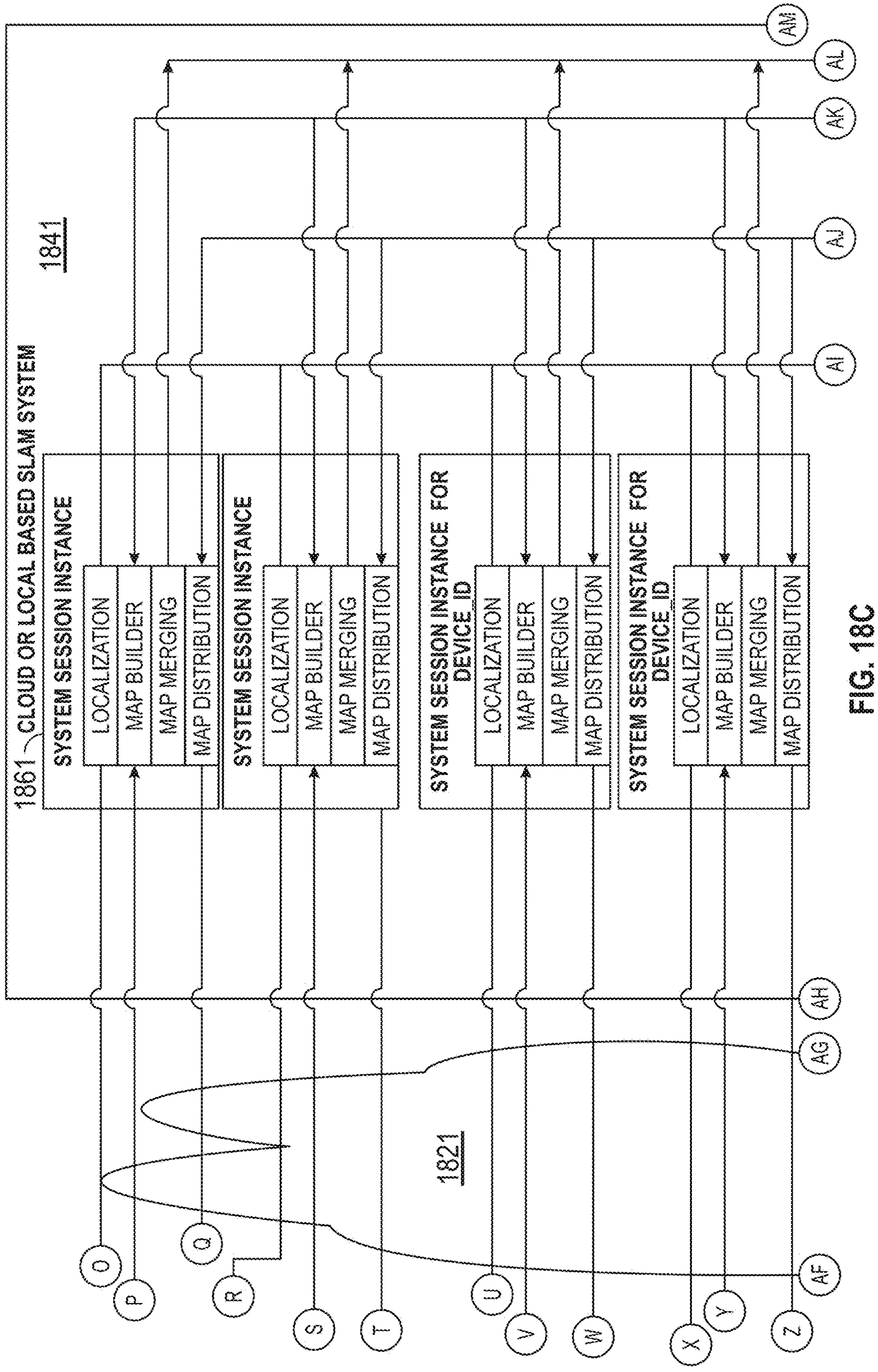
Figure 18D:
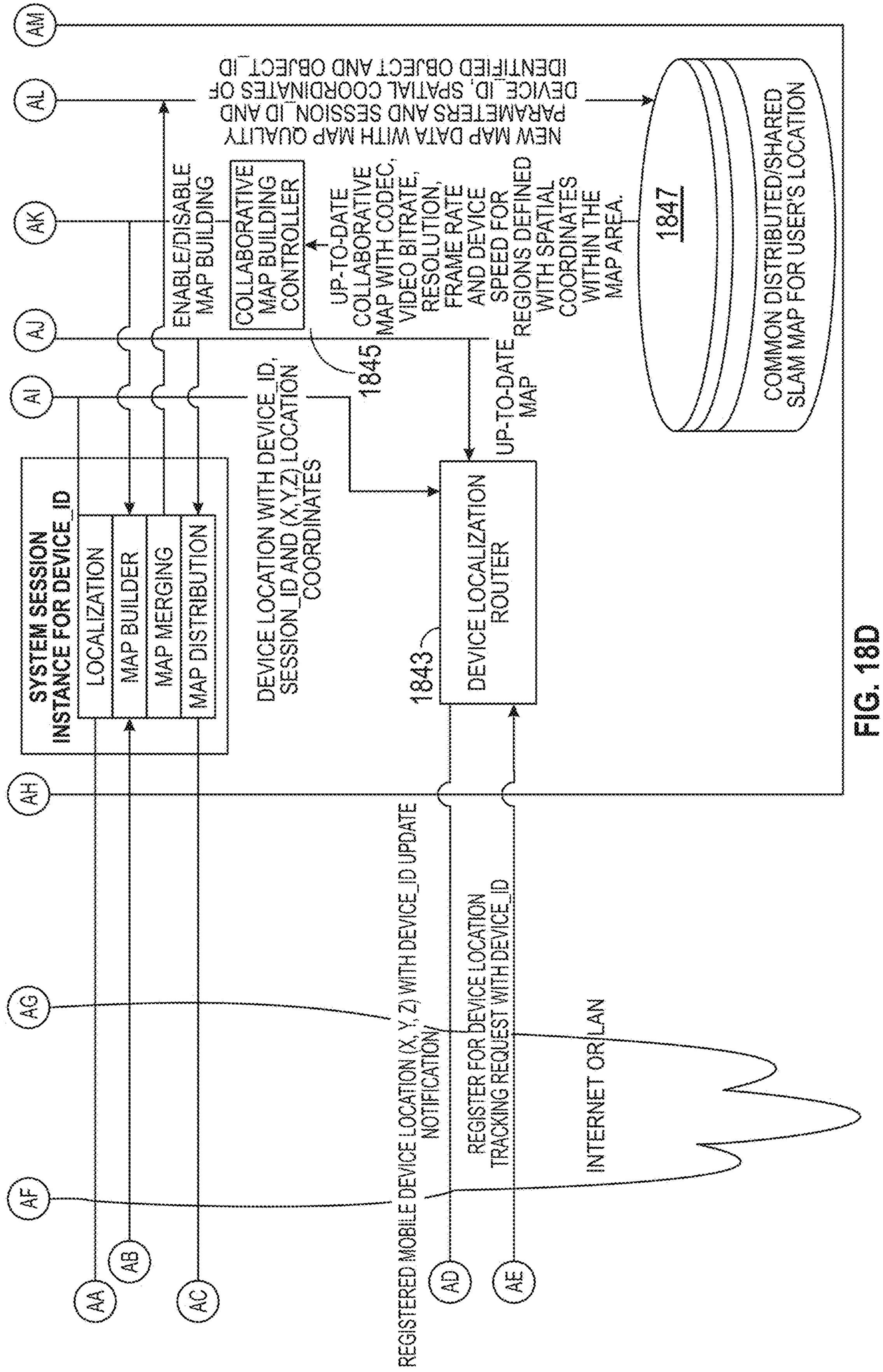

As shown in FIGS. 18B-18D, the XR device 101 and the physical devices may communicate via a network 1821, such as via a Wi-Fi wireless router and the internet, with a cloud-based or local coordinating SLAM system 1841, which may be a SLAM network edge. The coordinating SLAM system 1841 may include, or may be logically connected with, a device localization router 1843 communicating with a system session instance for each currently active physical device. A map building controller 1845 may generate a map and store map data in a common map database 1847 storing coordinates for devices on the physical space 1801/1803.

FIGS. 19A-19E show a modified architecture showing contextual object identification/classification in a distributed/shared SLAM system. A mapping of devices may also be built by a user viewing a spatial map on a device and the user manually locating and classifying objects on the visual map 2D.

Figure 19A:
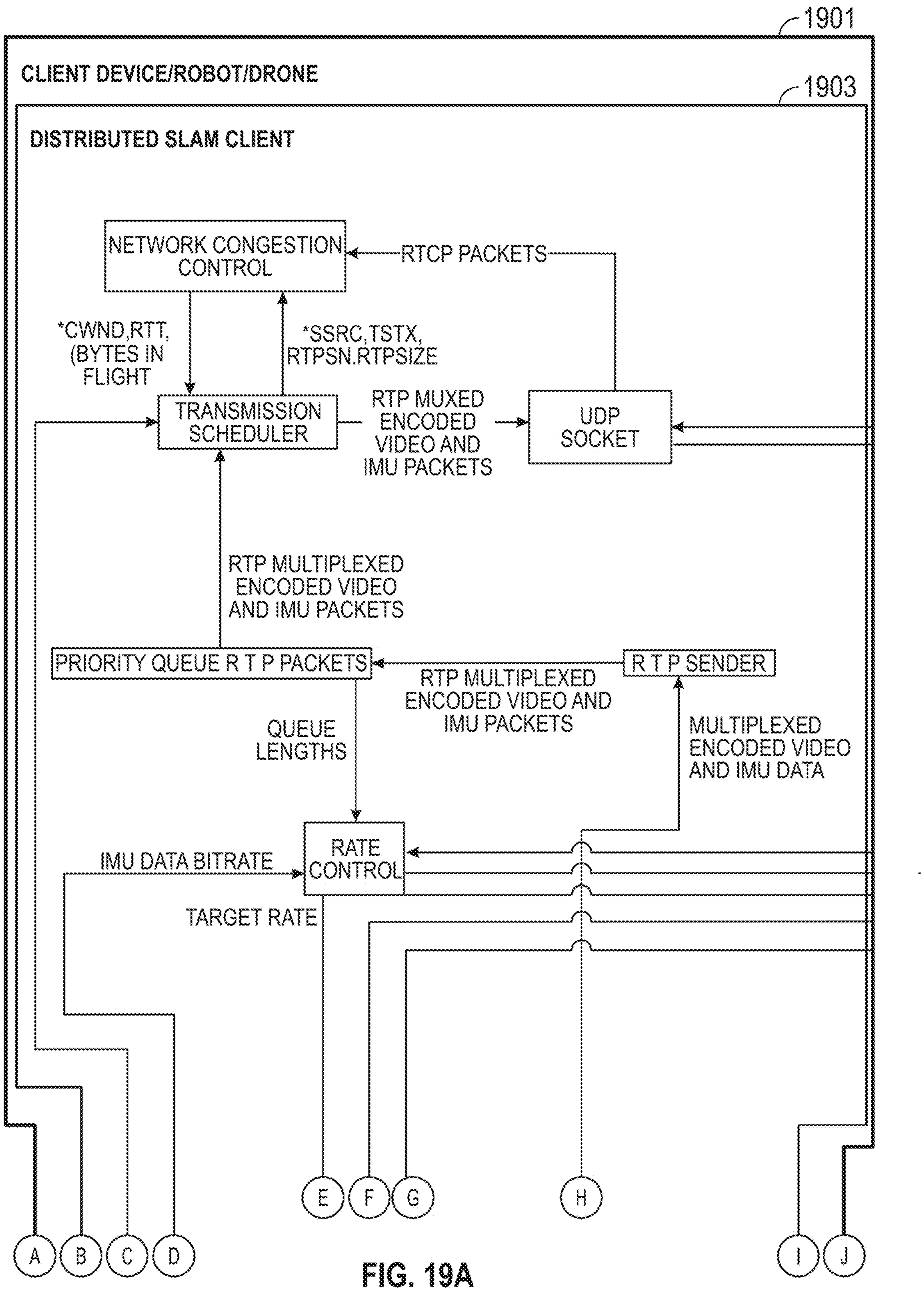
FIG. 19A-19E illustrate a system architecture for a SLAM system localization and mapping of a SLAM client device in communication with a SLAM network edge, according to an aspect of the disclosure.

FIG. 19A shows a SLAM-enabled device 1901 with a SLAM client 1903, which may be an application running on the SLAM-enabled device 1901. One or more applications of the SLAM client may identify, classify and register physical devices and other physical objects and their locations in the physical space used by the XR device 101.

Figure 19B:
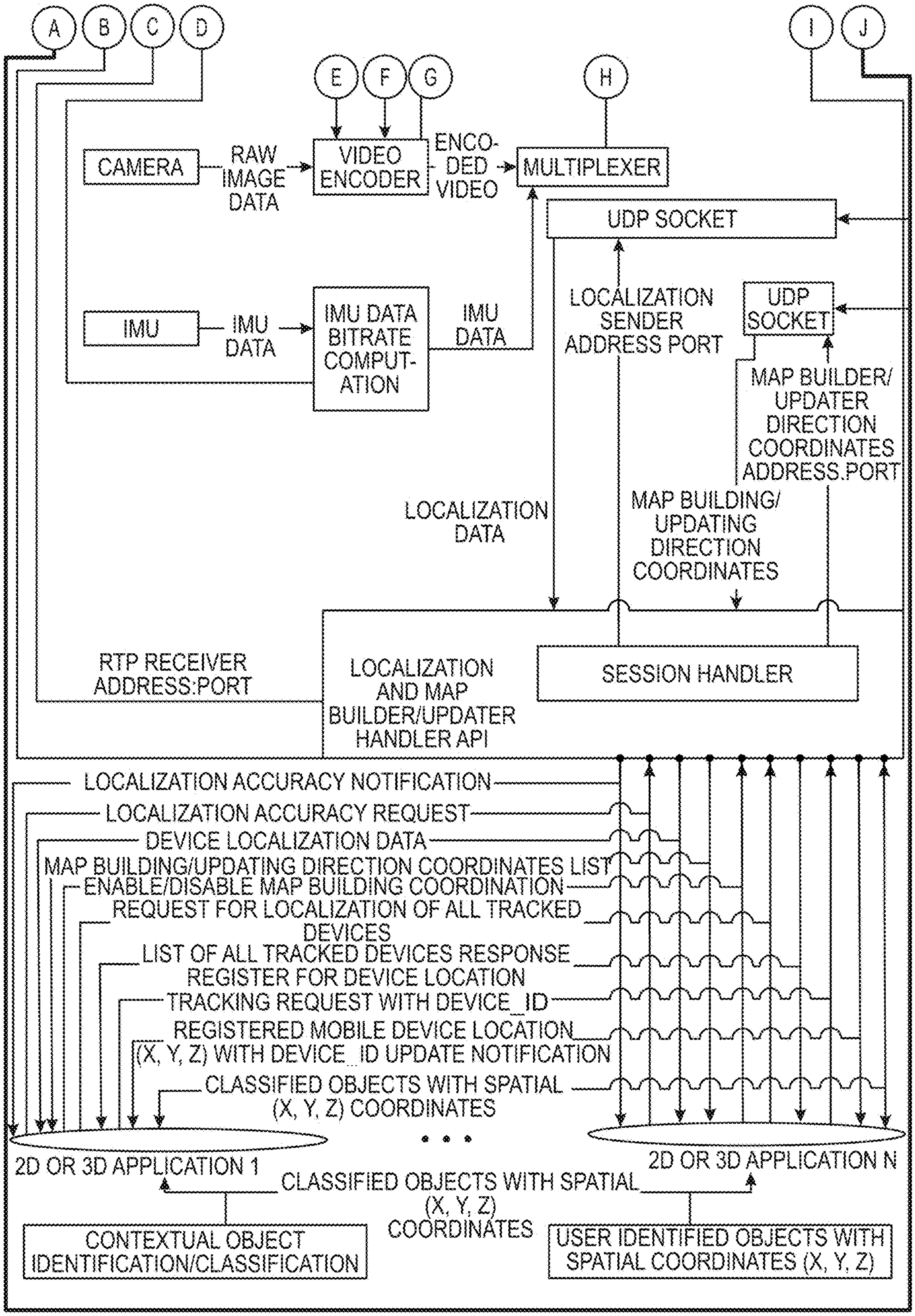
Figure 19C:
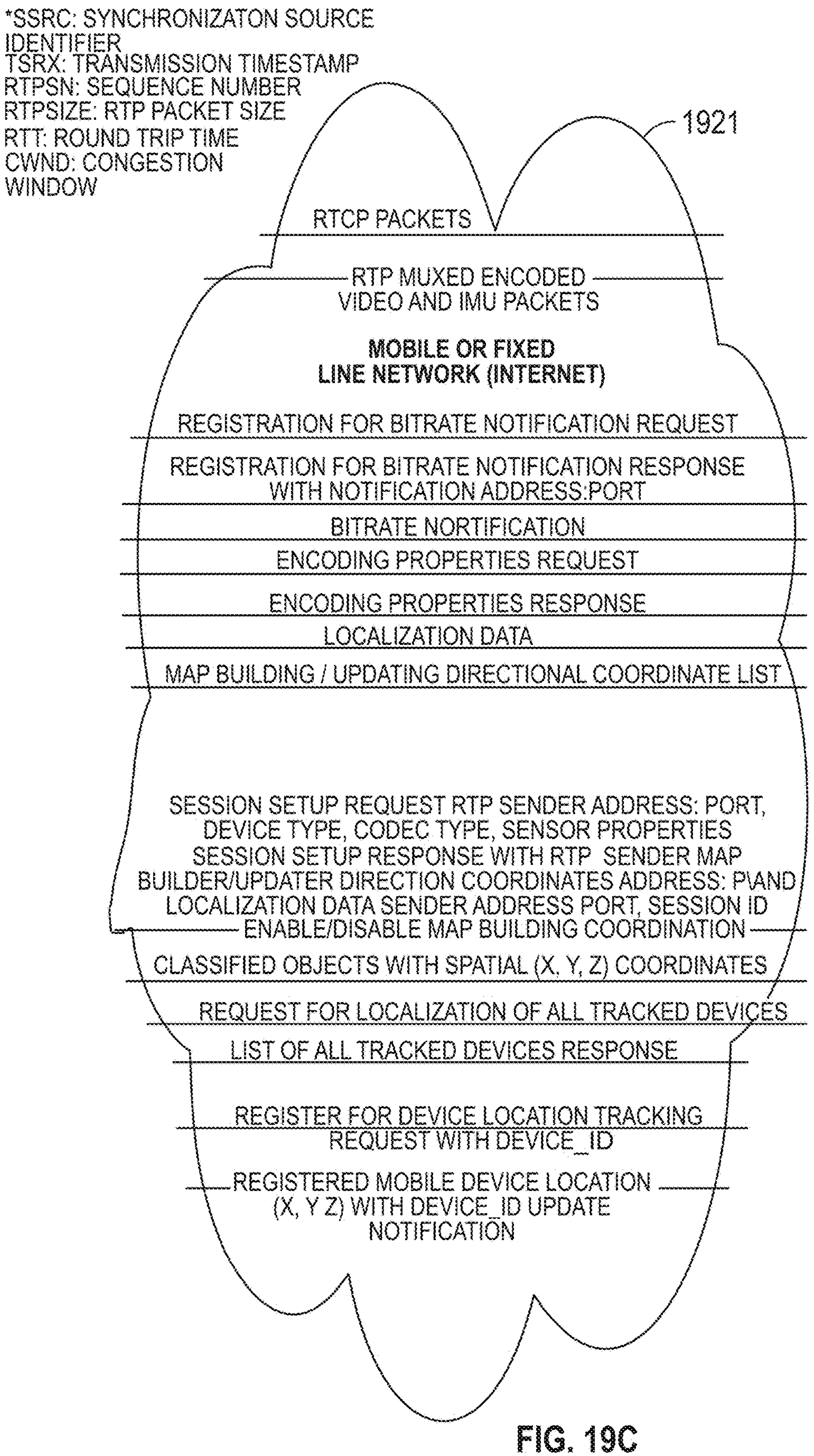

As shown in FIGS. 19B-19C, the SLAM client 1903 of the SLAM-enabled device 1901 may communicate via a network 1921 with a distributed SLAM network edge 1941 that handles mapping and localization of the physical objects and the XR device 101 in the physical space. The SLAM network edge 1941 is shown in FIG. 19C and may be provided locally or remotely.

Figure 19D:
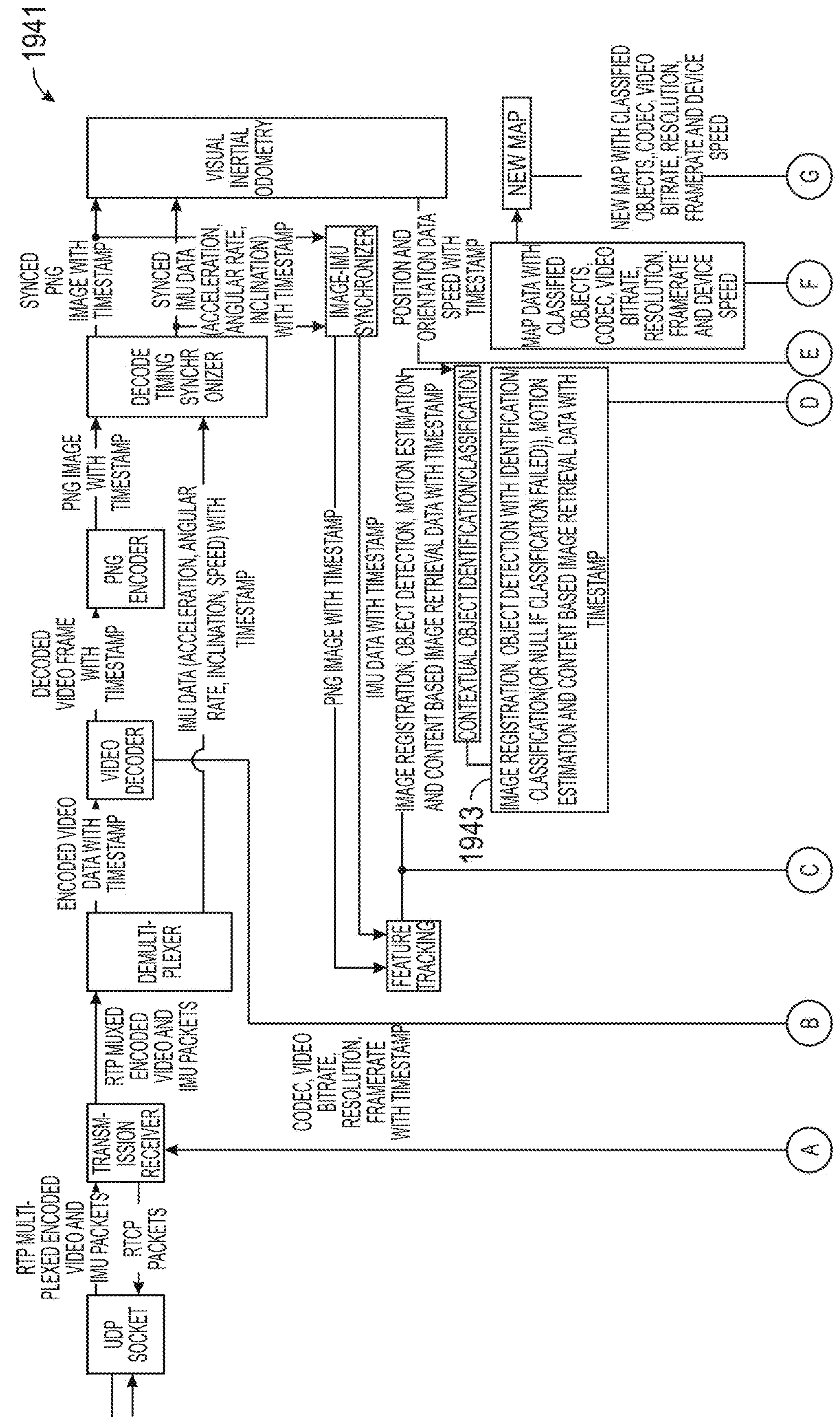
Figure 19E:
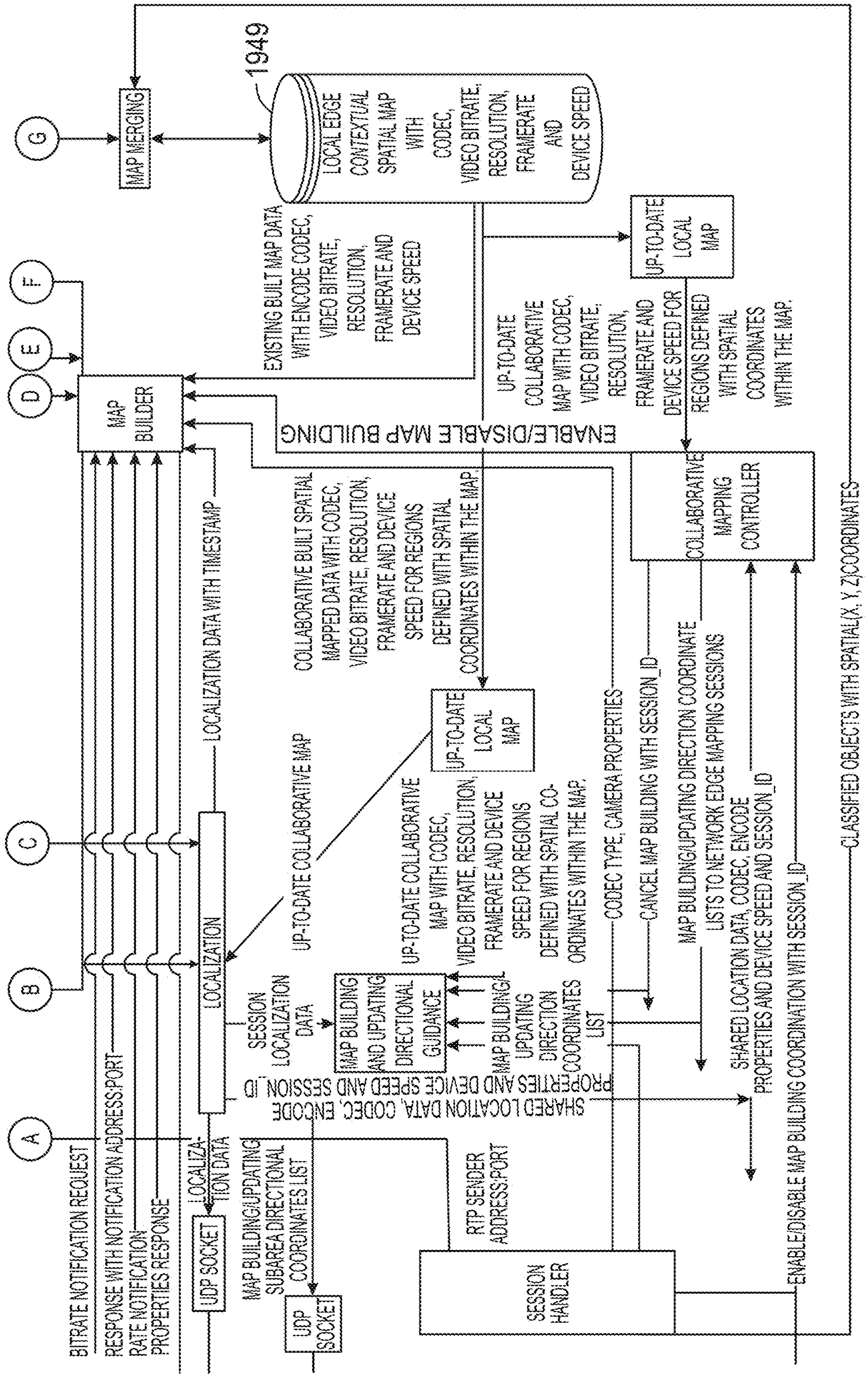

FIGS. 19D-E illustrate various components of the SLAM network edge 1941, which may include a physical object classification component 1943. A database 1949 of the SLAM network edge 1941 may store physical device identifying data, coordinates and other attributes thereof.

Figure 20:
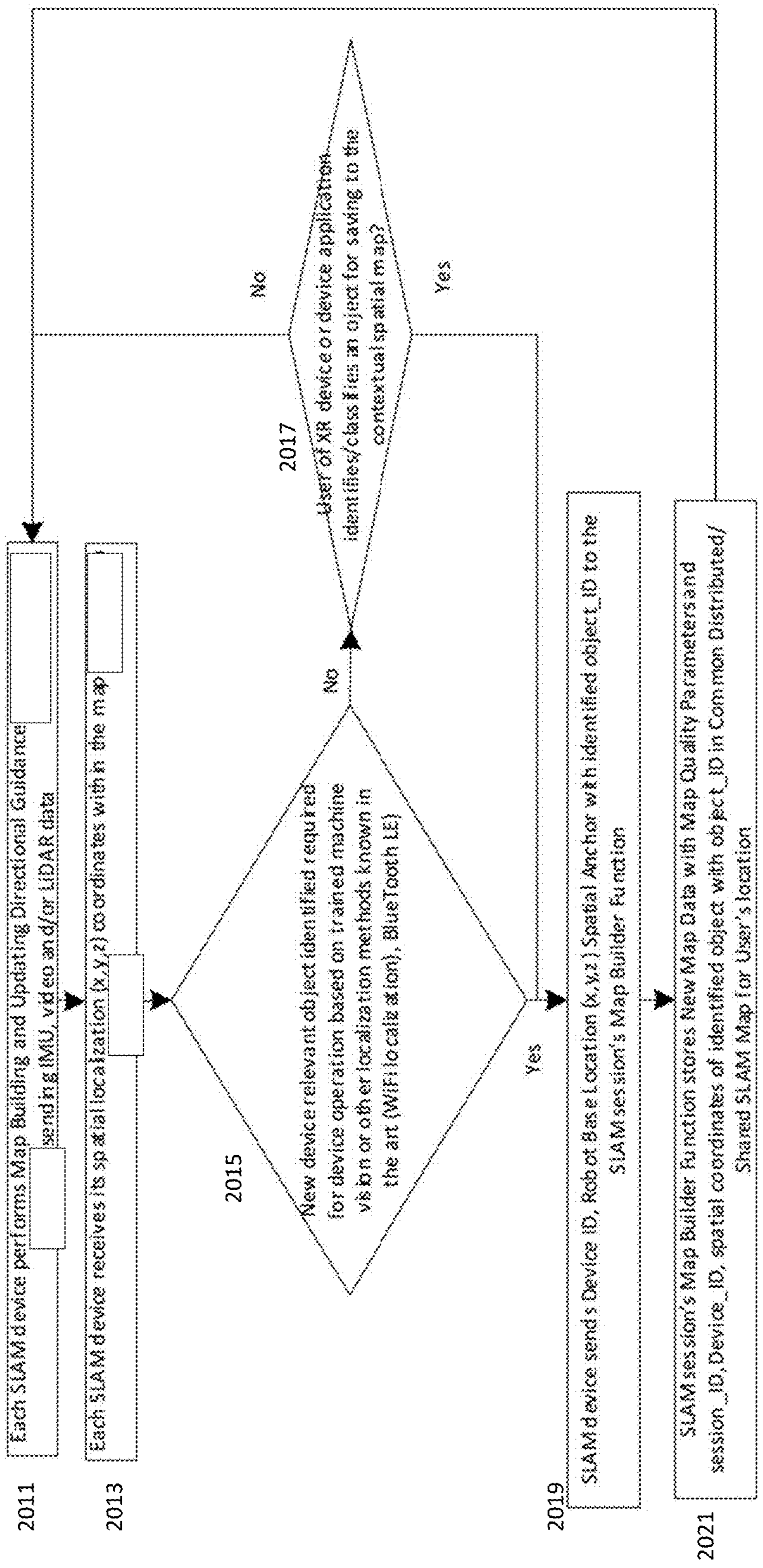
FIG. 20 illustrates a process for localizing a SLAM-enabled device and for collecting attributes of the SLAM-enabled device, according to an aspect of the disclosure.

FIG. 20 illustrates an example process for SLAM-enabled systems for contextual mapping along with storing the required contextual objects for their operation. Physical objects may be identified by an XR device 101 using machine vision or using XR device user's manual identification of physical objects, and saving the physical object identification along with the physical object's spatial coordinates into the distributed/shared contextual SLAM map.

At 2011, one or more SLAM-enabled devices collect map data, for example, using LIDAR or other image data. Inertial Measurement Unit (IMU) may also be transmitted. Based on the imaging data and the IMU data, a map is built and the SLAM-enabled device is localized relative to the map that is built, for example by a SLAM edge processor.

At 2013, SLAM-enabled devices receive spatial localization coordinates in two or three-dimensional space relative to the map. At 2015, if it is determined that a new physical device is identified, then at 2019, the SLAM-enabled device transmits to the SLAM map builder an identification of the physical device and coordinates. At 2021, the SLAM map builder stores the data. On the other hand, if at 2015, the determination is no, then at 2017 the user of the XR device 101 may identify and classify the new physical device so this data may be saved in the spatial map.

Figure 21:
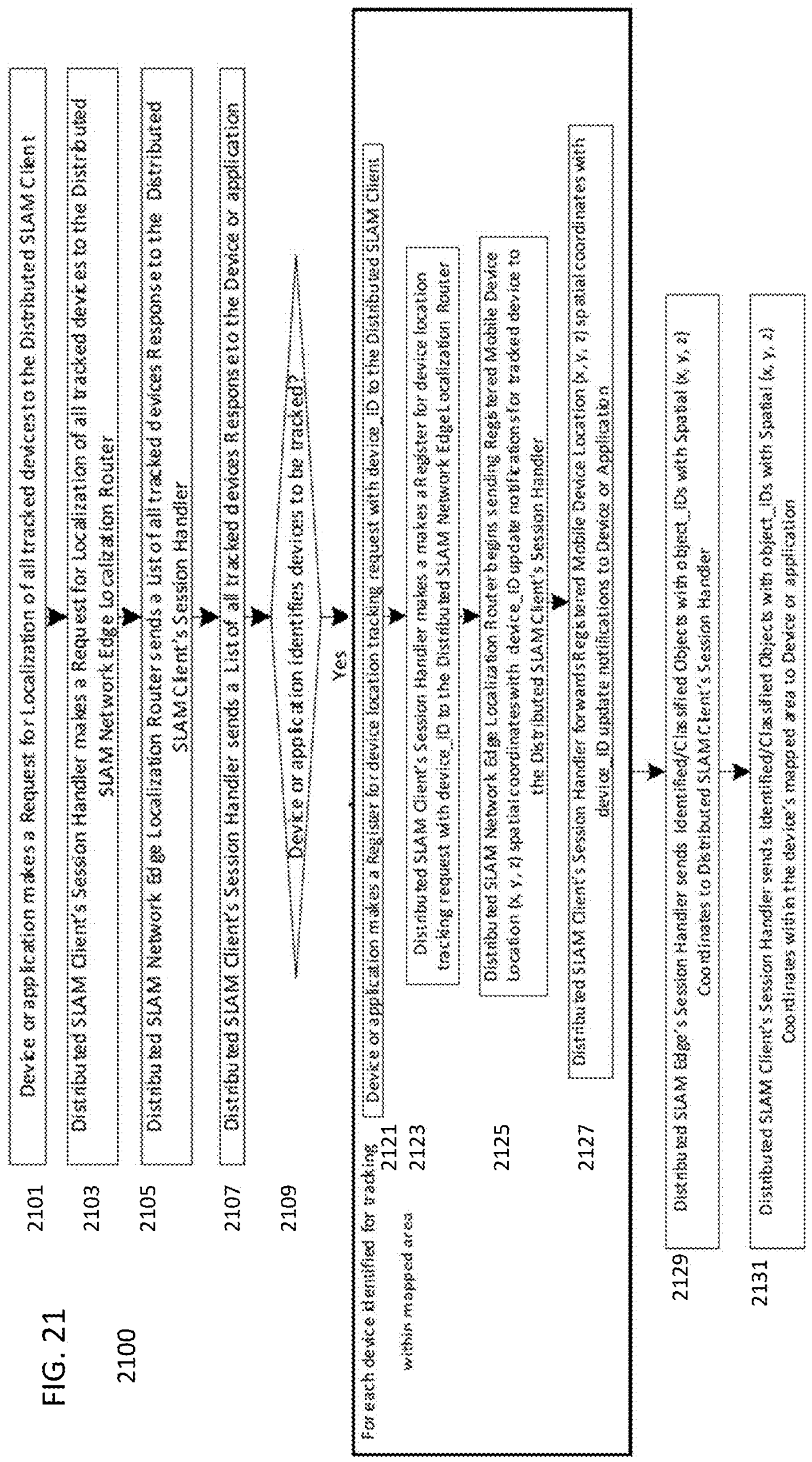
FIG. 21 illustrates a process for updating a SLAM-enabled device, for example, the XR device, with location data for physical devices in the physical space, according to an aspect of the disclosure.

The process illustrated in FIG. 21 is an example of SLAM-enabled operation to register with the SLAM system to receive Localization Routing notifications for specific objects of interest. This would be undertaken primarily with XR devices and mobile physical objects, such as drones, robotic vacuums, or lawn mowers. The system also may update the SLAM-enabled device with the spatial coordinates of contextual objects with the mapped area.

At 2101, a SLAM-enabled device application requests localization for itself, or for all tracked SLAM-enabled devices in the physical space, to its SLAM network client. At 2103, the SLAM client requests localization of tracked devices to the SLAM network edge. At 2105, the SLAM network edge sends a list of all tracked devices to the SLAM client. At 2107, the SLAM client sends a list of tracked devices that is responsive to the application that requested localization.

At 2109, it is determined whether devices to be tracked have been identified. If yes, then, for each device identified for tracking within the mapped area, a process is performed entailing: the device registering for device tracking at 2121, at 2123 registering the device location tracking request with the SLAM network edge, at 2125 the SLAM network edge localization router sending registered mobile device coordinates, and at 2127 the SLAM client's session handler forwarding the spatial coordinates to the requesting application.

At 2129, the SLAM network edge transmits coordinates of identified objects to the SLAM device's SLAM client. At 2131, the SLAM client sends the identified object's coordinates to the application of the XR device 101 requesting the coordinates of physical devices in the physical space.

Figure 22:
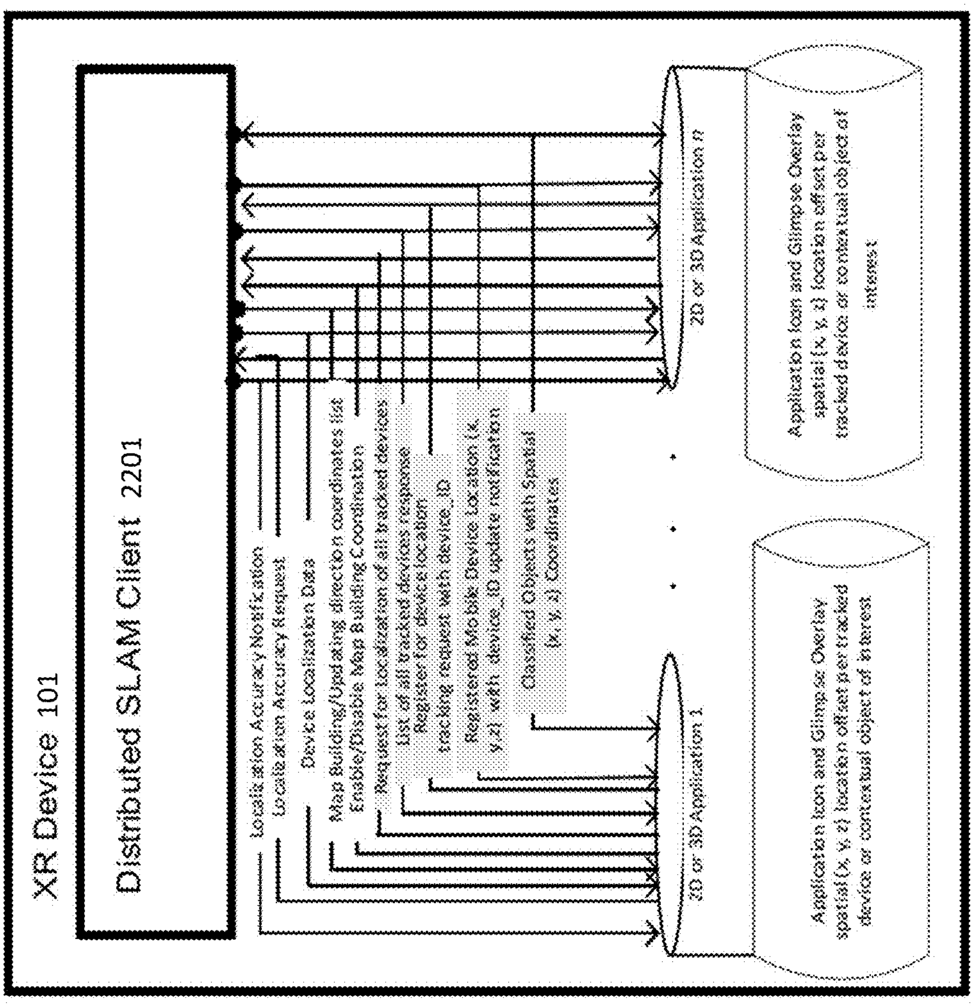
FIG. 22 illustrates an XR device and its SLAM client's processes, according to an aspect of the disclosure.

FIG. 22 shows an example system diagram of an XR device 101 with a SLAM client 2201. Visual elements associated with applications of the object of focus may be overlayed based on the offsets from the object of focus whose coordinates are determined as described herein. SLAM client 2201 of XR device 101 may handle SLAM processing in coordination with SLAM network edge.

Figure 23:
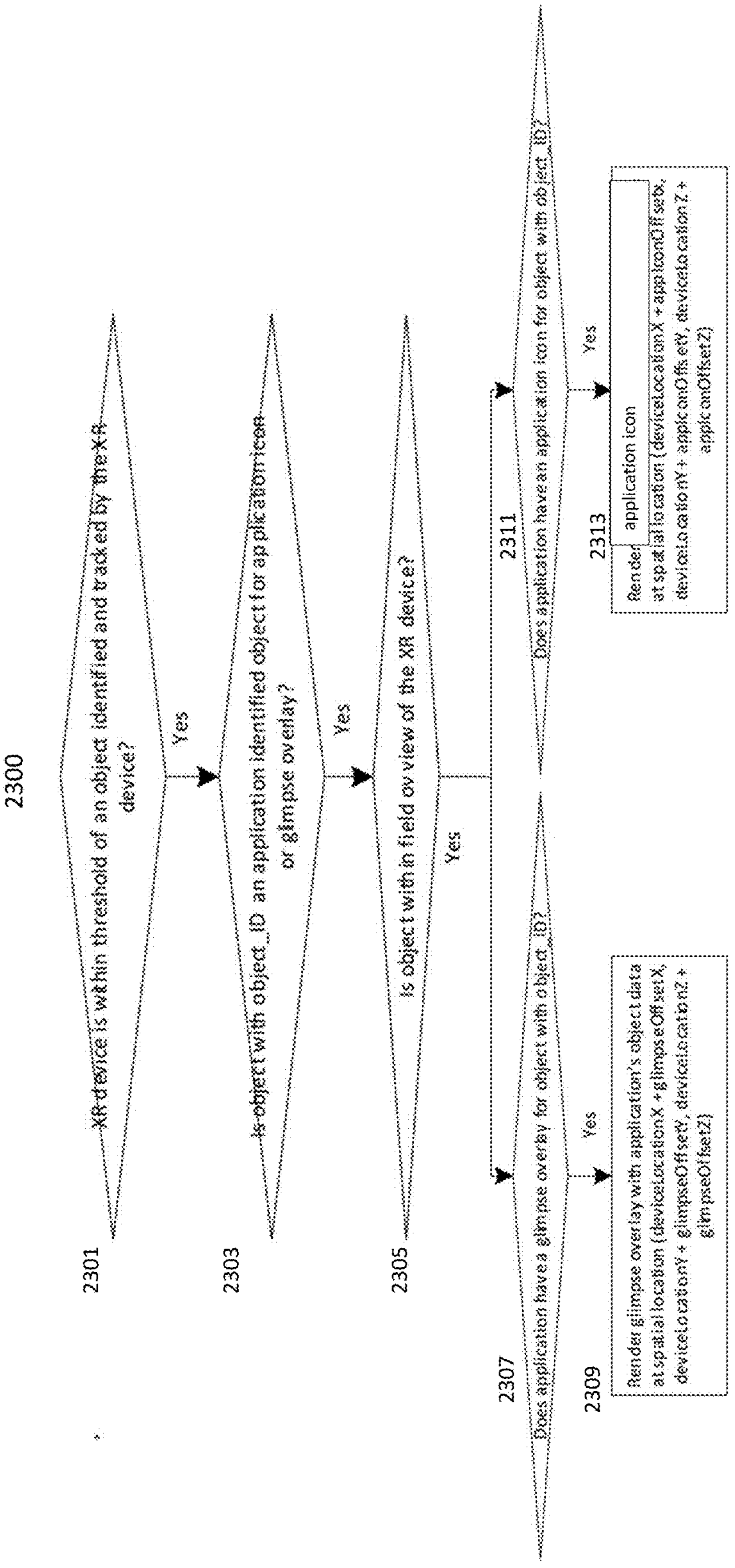
FIG. 23 illustrates a process for providing an XR device with a visual element or glimpse associated with an object of focus based on the XR device reaching a threshold condition with respect to the object of focus, according to an aspect of the disclosure.

FIG. 23 is an example of a process for displaying visual elements overlayed on a physical device of user interest, or on a surface nearby. At 2301, it is determined whether the XR device 101 is proximate an object of focus. As discussed herein, the object of focus may be determined in other ways as well. If yes, then at 2303, an object ID of an application identified for the object of focus may be obtained. If yes at 2303, then at 2305 it is determined whether the object is in within the field of view of the XR device. If at 2305 this is determined to be yes, then at 2307 it is determined whether the application associated with the object of focus has a visual elements overlay for the application of the object of focus that has been identified at 2303. If yes, then, at 2309, the visual elements are overlaid on, or near, the physical device. The visual element may be seen by the XR device user as an x, y, z spatial coordinate offset from the device location. Also, if the determination at 2305 is yes, then at 2311, it is determined whether there is an application icon associated with the identified application. If yes, then the application icon is displayed offset from the known coordinates of the object of focus.

Figure 24:
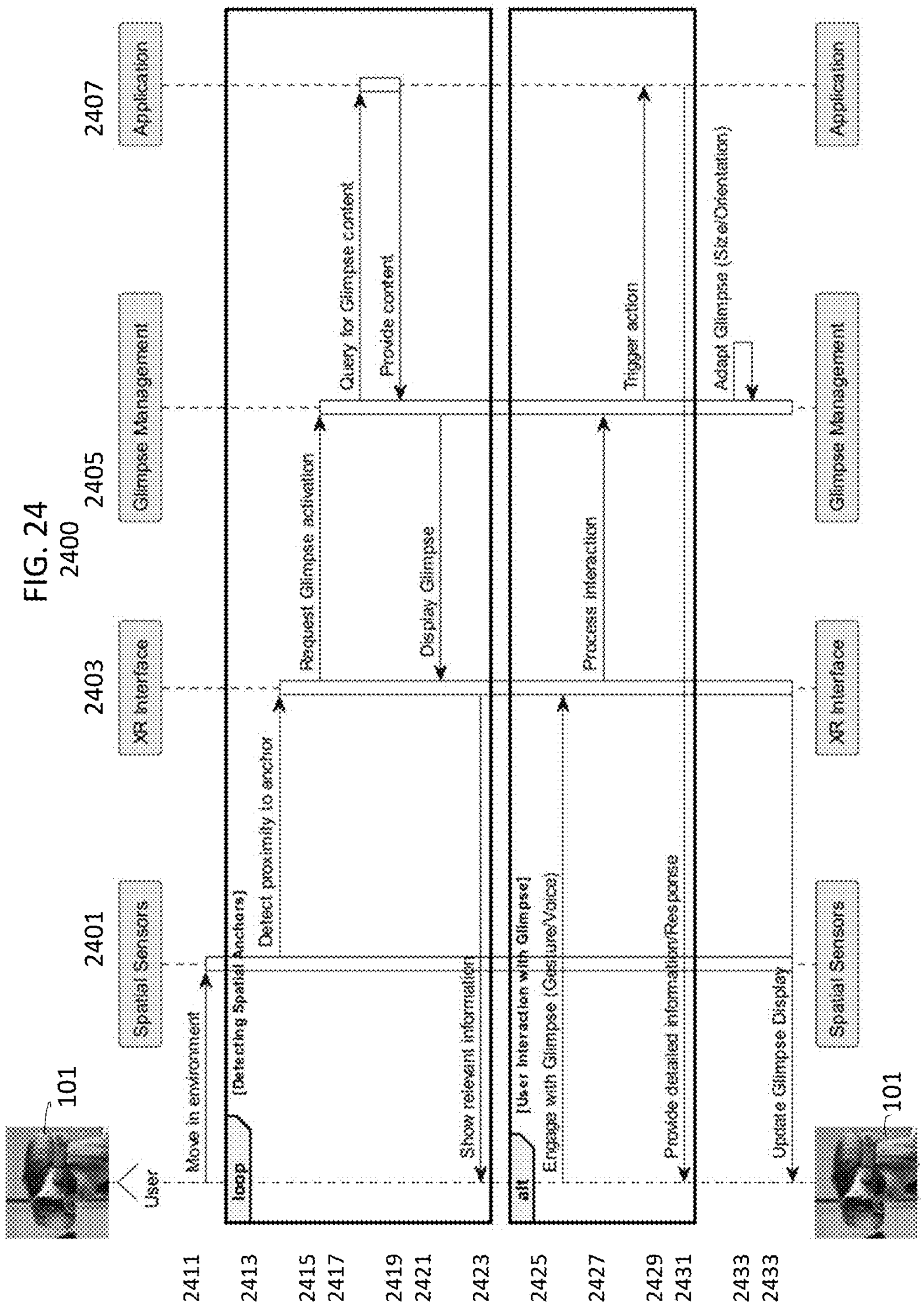
FIG. 24 is a communication flow diagram between components showing an example of processing for visual element or glimpse activation and updating, according to an aspect of the disclosure.

FIG. 24 is a communication diagram for components of a system in which the object of focus is an appliance, such as a refrigerator, or a room thermometer/temperature controller as shown in FIG. 3. At 2411, the XR device 101 is determined detected as moving in the environment by spatial sensors 2401. Spatial sensor 2401 may be part of the XR device. At 2413, spatial sensors 2401 transmit the detection of the XR device's proximity to the known spatial anchor corresponding to a location of a physical device, such as an appliance in the house.

At 2415, XR interface 2403 requests glimpse activation from glimpse management 2405. As discussed, the glimpse may include visual elements describing apps active or available on the physical device. At 2417, glimpse management 2405 queries the relevant identified application 2407 of the physical device for glimpse content. In response, the application 2407 transmits glimpse content to glimpse management 2405. Glimpse management 2405, at 2421, transmits the visual elements as the glimpse content to the XR interface 2403. At 2423, the XR interface 2403, causes display of the relevant visual elements by XR device 101.

At 2425, the XR device 101 engages with the visual elements, using gesture or voice input. In response, at 2427, the XR interface 2403 processes the interaction and transmits a request to glimpse management 2405 for further processing. Glimpse management 2405 transmits a trigger action to application 2407 based on the user input received at 2425. In response, and 2431, the application 2407 provides detailed information regarding the app or otherwise modifies the visual element displayed by the XR device 101.

At 2433, glimpse management 2405 may modify the size or orientation of the visual element being displayed by XR device 101. This change is size orientation may be initiated in response to an activation request received at 2415 by glimpse management 2405. For example, the change in size or orientation requested may be based on the distance of the XR device 101 from the object of interest or from a wall on which the glimpse is displayed. At 2433, the XR interface 2403 updates the glimpse display accordingly.

Figure 25:
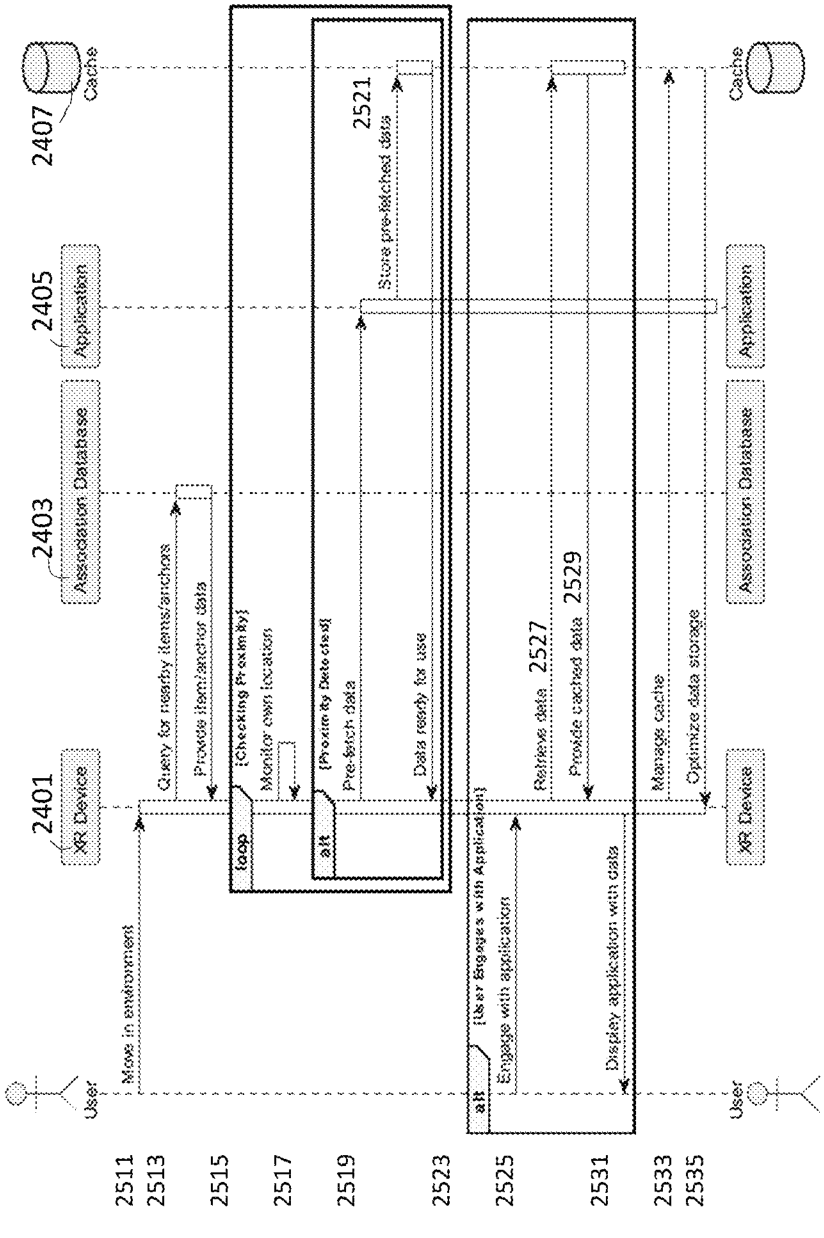
FIG. 25 is a communication flow diagram between components showing an example of processing for pre-fetching data and for dynamic adjustment of visual elements provided to an XR device, according to an aspect of the disclosure.

In an embodiment illustrated in FIG. 25, glimpses may comprise both standard interface features and features that may be personalized for an individual user based on the user's profile associated with the XR device 101, the XR application and/or other personalizing profile content that may be retrieved for the user of the XR device 101 or for other users of the physical device of focus. Glimpse data may be dynamically adjusted based on a plurality of factors such as state of the physical device of interest, time of day, user profiles, or the like. For example, a glimpse provided by an XR media application device (such as a FireTV stick) may detect that the TV is turned off. The glimpse may aggregate data from one or more sources, such as upcoming shows from a first source or server platform, a recommendation from a second source or server platform, or the like. If the TV is determined to be in an on state, for example, if the TV is on and the application running in the foreground of the device is a media streaming application, a larger portion of the area of the glimpse interface may be assigned to the currently running application. For example, if the TV is on and Hulu is the currently running application, the glimpse user interface may be focused on data and interactions provided by the Hulu application. However, other visual elements may additionally be provided, for example, streaming ESPN content on a smaller virtual display provided on the visual element, if it is determined, based on the XR device user's profile indicating frequent viewing of a sports team, that the XR device wearer is likely interested in a game played by this team now being broadcast on ESPN.

In an embodiment, the system uses spatial mapping and localization to track the XR device's position as well as the positions of previously identified and associated items and objects. The XR device monitors its own location continuously consulting the associations database to determine if any previously identified and associated items or manually associated spatial anchor points are within proximity to the XR device. When an item or spatial anchor is within proximity to the XR device, the system may pre-fetch application from the associated applications—for example, by registering with an application "background" data API or by retrieving an API service endpoint URL from the associations datastore and using the API to retrieve data from the application's service provider. This pre-fetching may enable the display of relevant data in real time such as when the application provides "glimpses" as a subset of its user interface. The pre-fetching process may employ predictive algorithms, which assess the likelihood of user engagement with the application or application data. These algorithms consider factors such as the user's historical interaction patterns. For example, pre-fetching may be performed if the system recognizes a schedule or pattern of television consumption behavior related to a show or content platform.

The pre-fetched data may be stored in a cache within the XR device, primed for immediate use when the user engages with the application or when an object of focus is determined. Data management algorithms may be used to optimize the utilization of the cache, ensuring that frequently accessed data is readily available while less relevant data may be cleared periodically to free up space.

At 2511, the XR device 2401 detects movement by the XR device wearer. For example, the user may enter a physical space and turn on the XR device 2401. At 2513, the XR device 2401 queries and association database 2403 for nearby spatial anchors or coordinates of known physical devices.

In response, at 2515, the association database 2403 provides location data of known devices. At 2517, the XR device 2401 monitors its own location and, at 2519, the XR device 2401 may prefetch data regarding an applications residing or available on a physical device of potential interest from an associated application 2405. At 2521 the prefetched application data is stored in data cache 2407 for real time use. At 2523, the prefetch data is transmitted from cachet 2407 to the XR device 2401.

If the user is detected by XR device 2401 to engage with the application, then, at 2527, the application data is requested from cache 2407. In response, at 2529, the cache 2407 transmits the cached data to the XR device 2401. The XR device 2401 provide the display to the user at 2531. At 2533, the XR device 2401 may transmit cache management instruction to cache 2407, pursuers to which data storage optimized at 2535.

One or more actions of the methods 1000-1700, 2000, 2100 and 2300-2500 may be incorporated into or combined with one or more actions of any other process or embodiments described herein. These and other methods described herein, or portions thereof, may be saved to a memory or storage (e.g., of the systems shown in FIG. 8) or locally as one or more instructions or routines, which may be executed by any suitable device or system having access to the memory or storage to implement these methods.

The term "and/or," may be understood to mean "either or both" of the elements thus indicated. Additional elements may optionally be present unless excluded by the context. Terms such as "first," "second," "third" in the claims referring to a structure, module or step should not necessarily be construed to mean precedence or temporal order but are generally intended to distinguish between claim elements.

The above-described embodiments are intended to be examples only. Components or processes described as separate may be combined or combined in ways other than as described, and components or processes described as being together or as integrated may be provided separately. Steps or processes described as being performed in a particular order may be re-ordered or recombined.

Features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time.

It should also be noted that the systems and/or methods described above may be applied to, or used in accordance with, other systems and/or methods. In various embodiments, additional elements may be included, some elements may be removed, and/or elements may be arranged differently from what is shown. Alterations, modifications and variations can be affected to the particular embodiments by those of skill in the art without departing from the scope of the present application, which is defined solely by the claims appended hereto.

What is claimed is:

1. A method comprising:
receiving an indication of a physical device of user focus determined for an extended reality (XR) device;
receiving an identification of an application currently running on the physical device of user focus;
selecting, based at least in part on a user profile, a content item available for consumption, via the application, wherein the content item was previously caused to be displayed by the application and is currently not being displayed by the physical device of user focus;
based at least in part on the selecting the content item, causing the XR device to display a visual element comprising a user activatable control widget comprising a continue consuming option for the content item and an identification of the content item; and
based at least in part on receiving user interface input interacting with the user activatable control widget, causing display, by the physical device of user focus, of at least a portion of the content item.

2. The method of claim 1, wherein the XR device is a head-mounted device.

3. The method of claim 1, wherein the application is a first application, and the method further comprising:
causing the XR device to prevent displaying a graphical element generated by a second application associated with the physical device of user focus.

4. The method of claim 1, wherein the application is a first application, and the method further comprising:
causing the XR device to display more prominently the visual element associated with the first application than a visual element generated by a second application associated with the physical device of user focus.

5. The method of claim 1, further comprising:
causing the XR device to display the visual element such that the visual element is perceived to be at a fixed location anchored relative to the physical device of user focus.

6. The method of claim 5, further comprising:
receiving an indication of user interface input at the XR device selecting the fixed location of the visual element, wherein the fixed location anchored relative to the physical device of user focus is determined based on the indication.

7. The method of claim 1, wherein the physical device of user focus is determined based on physical proximity of the XR device to the physical device of user focus.

8. The method of claim 1, wherein the physical device of user focus is determined based on the user profile associated with the XR device.

9. The method of claim 1, wherein the visual element comprises an interface for interacting with the application or a visual indication of status information about the physical device of user focus.

10. The method of claim 1, wherein the physical device of user focus is determined based on the physical device of user focus being in a field of view of the XR device.

11. The method of claim 1, wherein the physical device of user focus is determined based on a user gaze determined by the XR device.

12. The method of claim 1, wherein the method further comprises:
determining, based at least in part on the user profile, that a current time corresponds to a time at which the visual element is not in an activatable mode; and
based at least in part on the determining that the visual element is not in the activatable mode, preventing the causing the XR device to display the visual element associated with the application.

13. The method of claim 1, wherein the method further comprises:
detecting a change in gaze of a user wearing the XR device; and
based at least in part on detecting the change in the gaze of the user wearing the XR device, causing the visual element to remain at a fixed location relative to the physical device of user focus.

14. The method of claim 1, wherein the visual element comprises a display regarding the content item contemporaneous with the user activatable control widget.

15. A system comprising:
a memory; and
control circuitry configured:
to receive an indication of a physical device of user focus determined for an extended reality (XR) device, and to store in the memory an identification of the physical device of user focus;
to receive an identification of an application currently running on the physical device of user focus;
to select, based at least in part on a user profile, a content item available for consumption, via the application, wherein the content item was previously caused to be displayed by the application and is currently not being displayed by the physical device of user focus;
to cause, based at least in part on the selecting the content item, the XR device to display a visual element comprising a user activatable control widget comprising a continue consuming option for the content item and an identification of the content item; and
to cause, based at least in part on receiving user interface input interacting with the user activatable control widget, display, by the physical device of user focus, of at least a portion of the content item.

16. The system of claim 15, wherein the XR device is a head-mounted device.

17. The system of claim 15, wherein the application is a first application, and wherein the system is configured:
to cause the XR device to prevent displaying a graphical element generated by a second application associated with the physical device of user focus.

18. The system of claim 15, wherein the application is a first application, and wherein the system is configured:

to cause the XR device to display more prominently the visual element associated with the first application than a visual element generated by a second application associated with the physical device of user focus.

19. The system of claim 15, wherein the system is configured:

to cause the XR device to display the visual element such that the visual element is perceived to be at a fixed location anchored relative to the physical device of user focus.

20. The system of claim 19, wherein the system is configured:

to receive an indication input at the XR device selecting the fixed location of the visual element, wherein the fixed location anchored relative to the physical device of user focus is determined based on the indication.

21. The system of claim 15, wherein the physical device of user focus is determined based on physical proximity of the XR device to the physical device of user focus.

* * * * *